US008713148B2

(12) United States Patent
Imai et al.

(10) Patent No.: US 8,713,148 B2
(45) Date of Patent: Apr. 29, 2014

(54) TRANSMISSION TERMINAL, TRANSMISSION SYSTEM, TRANSMISSION METHOD, AND RECORDING MEDIUM STORING TRANSMISSION CONTROL PROGRAM

(75) Inventors: Takuya Imai, Tokyo (JP); Kei Kushimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 231 days.

(21) Appl. No.: 13/160,870

(22) Filed: Jun. 15, 2011

(65) Prior Publication Data

US 2011/0314099 A1    Dec. 22, 2011

(30) Foreign Application Priority Data

Jun. 16, 2010 (JP) .................................. 2010-137335
Apr. 7, 2011 (JP) .................................. 2011-085070

(51) Int. Cl.
*H04L 12/24* (2006.01)

(52) U.S. Cl.
USPC ........................................................ 709/223

(58) Field of Classification Search
None
See application file for complete search history.

(56) References Cited

U.S. PATENT DOCUMENTS

| | | | | |
|---|---|---|---|---|
| 6,363,421 | B2 * | 3/2002 | Barker et al. | 709/223 |
| 6,539,427 | B1 * | 3/2003 | Natarajan et al. | 709/224 |
| 7,246,371 | B2 * | 7/2007 | Diacakis et al. | 709/204 |
| 7,409,430 | B2 * | 8/2008 | Leukert-Knapp et al. | 709/207 |
| 7,756,979 | B1 | 7/2010 | Staack et al. | |
| 2007/0025237 | A1 * | 2/2007 | Goto | 370/216 |
| 2008/0228892 | A1 | 9/2008 | Staack et al. | |
| 2009/0093250 | A1 | 4/2009 | Jackson et al. | |

FOREIGN PATENT DOCUMENTS

| | | |
|---|---|---|
| CN | 1845556 A | 10/2006 |
| EP | 2 166 506 A2 | 3/2010 |
| EP | 2 166 506 A3 | 3/2010 |
| JP | 61-279898 | 12/1986 |
| JP | 7-162825 | 6/1995 |
| JP | 2005257335 A * | 9/2005 |
| WO | WO 02/07396 A1 | 1/2002 |

OTHER PUBLICATIONS

Extended Search Report issued Sep. 9, 2011 in European patent Application No. 11168625.7-1244.
Chinese Office Action issued Aug. 26, 2013, in China Patent Application No. 201110153360.1.
Yasuhisa Niimi, "Speech Recognition", Information Science Lecture E-19-3, Kyoritsu Publishing, Co., 1979, reference previously filed, submitting English translation only, 7 pages.
L. Rabiner, et al., "Fundamentals of Speech Recognition", NTT AdvanceTechnology, 1995, pp. 245-300.

* cited by examiner

Primary Examiner — Jeffrey R Swearingen
(74) Attorney, Agent, or Firm — Oblon, Spivak, McClelland, Maier & Neustadt, L.L.P.

(57) ABSTRACT

A transmission terminal communicates contents data with a counterpart transmission terminal through a first session, and transmits management data to a management system through a second session. When a predetermined event that may prevent or interrupt communication with a user at the counterpart terminal is detected, the transmission terminal obtains countermeasure data, and transmits the countermeasure data to the management system through the second session.

15 Claims, 25 Drawing Sheets

FIG. 5A

| EVENT DATA | EVENT TEXT DATA | COUNTERMEASURE DATA | | VOICE DATA COMMUNICATION DATA |
|---|---|---|---|---|
| 001 (MICROPHONE ERROR) | MICROPHONE ERROR | REPLACING WITH NEW MACHINE. WE WILL RE-CONNECT IN ○ MINS. | PLEASE CALL. | FALSE |
| 002 (SPEAKER ERROR) | SPEAKER ERROR | REPLACING WITH NEW MACHINE. WE WILL RE-CONNECT IN ○ MINS. | PLEASE CALL. | FALSE |
| 003 (CAMERA ERROR) | CAMERA ERROR | REPLACING WITH NEW MACHINE. WE WILL RE-CONNECT IN ○ MINS. | PRESS ○ KEY. | TRUE |
| 004 (OPERATION KEY ERROR OR USER NOT PRESENT) | OPERATION KEY ERROR | REPLACING WITH NEW MACHINE. WE WILL RE-CONNECT IN ○ MINS. | PRESS ○ KEY. | TRUE |
| 005 (CONNECTION ERROR WITH RELAY TERMINAL) | NOT CONNECTED WITH RELAY TERMINAL | REPLACING WITH NEW MACHINE. WE WILL RE-CONNECT IN ○ MINS. | PLEASE CALL. | FALSE |
| ... | ... | ... | | ... |

FIG. 5B

| EVENT DATA | EVENT TEXT DATA | COUNTERMEASURE DATA | | VOICE DATA COMMUNICATION DATA |
|---|---|---|---|---|
| 001 (MICROPHONE ERROR) | MICROPHONE ERROR IN COUNTERPART TERMINAL | O.K. WE WILL WAIT FOR ○ MINS. | PLEASE CALL. | FALSE |
| 002 (SPEAKER ERROR) | SPEAKER ERROR IN COUNTERPART TERMINAL | O.K. WE WILL WAIT FOR ○ MINS. | PLEASE CALL. | FALSE |
| 003 (CAMERA ERROR) | CAMERA ERROR IN COUNTERPART TERMINAL | O.K. WE WILL WAIT FOR ○ MINS. | PRESS ○ KEY. | TRUE |
| 004 (OPERATION KEY ERROR OR USER NOT PRESENT) | OPERATION KEY ERROR IN COUNTERPART TERMINAL | O.K. WE WILL WAIT FOR ○ MINS. | PRESS ○ KEY. | TRUE |
| 005 (CONNECTION ERROR) | COUNTERPART TERMINAL NOT CONNECTED WITH RELAY TERMINAL | O.K. WE WILL WAIT FOR ○ MINS. | PLEASE CALL. | FALSE |
| ... | ... | ... | | ... |

FIG. 6

DATA QUALITY MANAGEMENT TABLE

| TERMINAL IP ADDRESS | IMAGE DATA QUALITY |
|---|---|
| 1.3.2.4 | HIGH |
| 1.3.1.3 | LOW |
| 1.3.2.3 | MEDIUM |
| ... | ... |

FIG. 7A

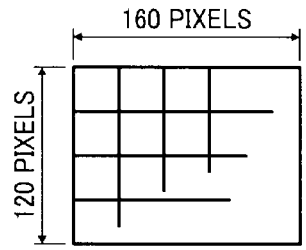

160 PIXELS / 120 PIXELS

FIG. 7B

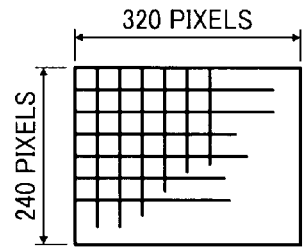

320 PIXELS / 240 PIXELS

FIG. 7C

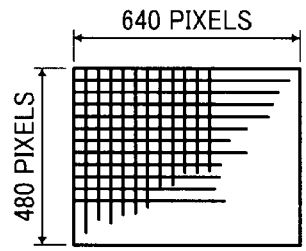

640 PIXELS / 480 PIXELS

FIG. 8

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 9

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ON-LINE (OK) | 2009.11.10.13:40 | 1.2.1.3 |
| 01ab | JAPAN TOKYO OFFICE AB TERMINAL | OFF-LINE | 2009.11.09.12:00 | 1.2.1.4 |
| 01ba | JAPAN OSAKA OFFICE BA TERMINAL | ON-LINE (HOLD) | 2009.11.10.13:45 | 1.2.2.3 |
| 01bb | JAPAN OSAKA OFFICE BB TERMINAL | ON-LINE (COMMUNICATING) | 2009.11.10.13:30 | 1.2.2.4 |
| ... | ... | ... | ... | ... |
| 01db | U.S. WASH. D.C. OFFICE DB TERMINAL | ON-LINE (OK) | 2009.11.10.13:50 | 1.3.2.4 |

FIG. 11

CANDIDATE LIST MANAGEMENT TABLE

| REQUEST TERMINAL ID | COUNTERPART TERMINAL ID |
|---|---|
| 01aa | 01ab, 01ba, 01bb, 01db |
| 01ab | 01aa, 01ca, 01cb |
| 01ba | 01aa, 01ab, 01ca, 01cb, 01da, 01db |
| ... | ... |
| 01db | 01aa, 01ba, 01ca, 01cb, 01da |

FIG. 12

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | | | | | ... |

FIG. 13

ADDRESS PRIORITY MANAGEMENT TABLE

| DOT ADDRESS SIMILARITY | ADDRESS PRIORITY POINT |
|---|---|
| S. S. S. D | 5 |
| S. S. D. - | 3 |
| S. D. -. - | 1 |
| D. -. -. - | 0 |

FIG. 14

TRANSMISSION SPEED PRIORITY MANAGEMENT TABLE

| MAXIMUM DATA TRANSMISSION SPEED (Mbps) | TRANSMISSION SPEED PRIORITY POINT |
|---|---|
| 1000 - | 5 |
| 100 - 1000 | 3 |
| 10 - 100 | 1 |
| - 10 | 0 |

FIG. 15

QUALITY MANAGEMENT TABLE

| DELAY TIME (ms) | IMAGE DATA QUALITY |
|---|---|
| 0 - 100 | HIGH |
| 100 - 300 | MEDIUM |
| 300 - 500 | LOW |
| 500 - | (INTERRUPT) |

FIG. 16

| LOG ID | MANAGEMENT DATA | SESSION ID | TIME DATA |
|---|---|---|---|
| 001 | invite | se1 | 2009.11.10 13:45 |
| 002 | bye | se1 | 2009.11.10 14:30 |
| ... | ... | ... | ... |
| 025 | invite | se80 | 2010.2.3 9:32 |
| 026 | error | se80 | 2010.2.3 9:45 |

FIG. 23

| RELAY TERMINAL ID | ADDRESS PRIORITY POINT | | TRANSMISSION SPEED PRIORITY POINT | TOTAL PRIORITY POINT |
|---|---|---|---|---|
| | FIRST ADDRESS PRIORITY POINT FOR REQUEST | SECOND ADDRESS PRIORITY POINT FOR COUNTERPART TERMINAL | | |
| 111a | 5 | 1 | 3 | 8 |
| 111b | 3 | 1 | 5 | 8 |
| 111c | — | — | — | — |
| 111d | 1 | 5 | 1 | 6 |

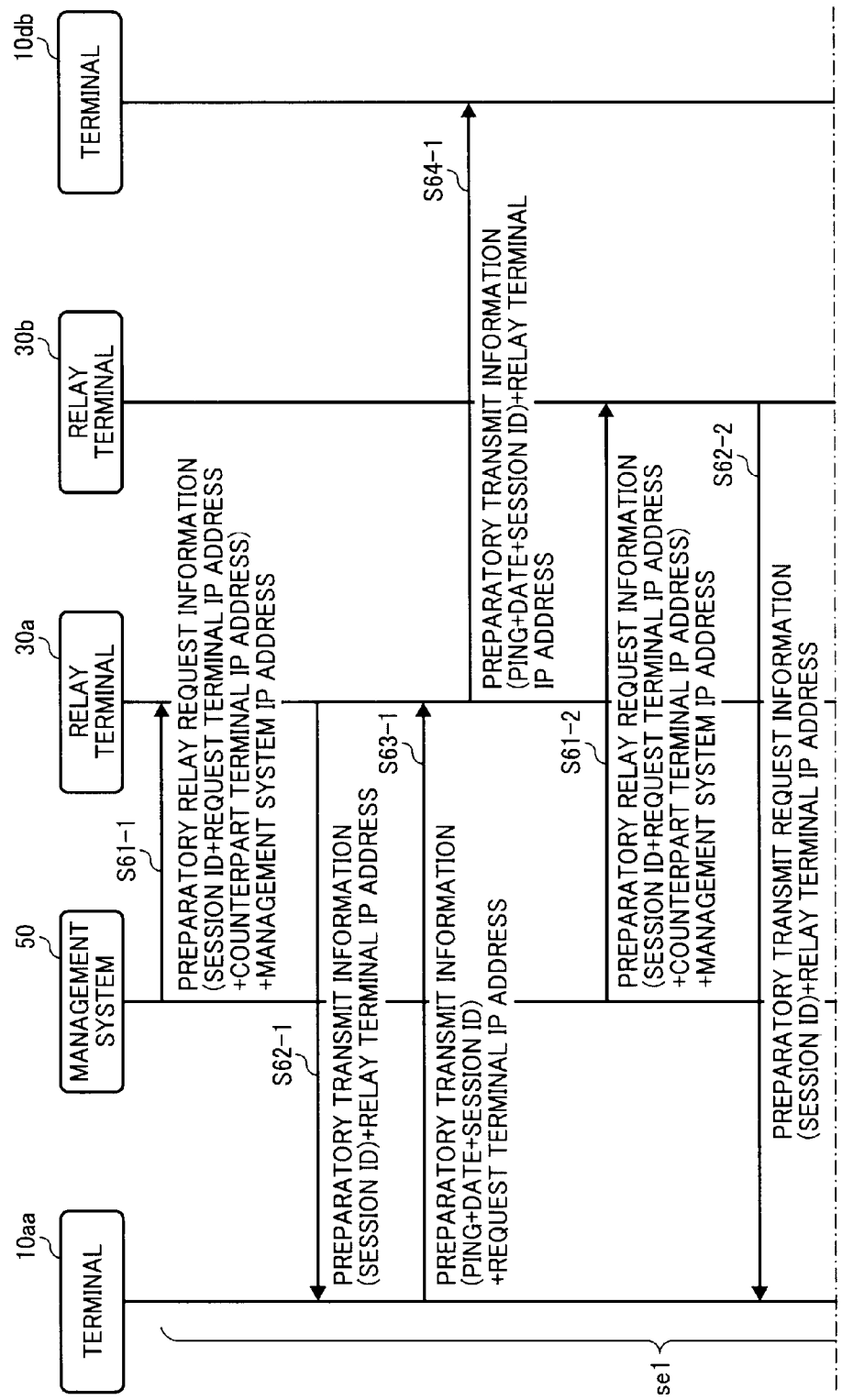

MICROPHONE ERROR.

PLEASE SELECT KEY TO SEND A MESSAGE.
UPPER KEY: REPLACING WITH A NEW MACHINE. WE WILL RECONNECT IN ○ MINUTES.
LOWER KEY: PLEASE CALL.

312

CAMERA ERROR.

PLEASE PRESS RIGHT KEY TO RESUME COMMUNICATION.

TRANSMISSION TERMINAL, TRANSMISSION SYSTEM, TRANSMISSION METHOD, AND RECORDING MEDIUM STORING TRANSMISSION CONTROL PROGRAM

CROSS-REFERENCE TO RELATED APPLICATIONS

This patent application is based on and claims priority pursuant to 35 U.S.C. §119 to Japanese Patent Application No. 2010-137335, filed on Jun. 16, 2010, and 2011-085070, filed on Apr. 7, 2011 in the Japanese Patent Office, the entire disclosure of which is hereby incorporated herein by reference.

FIELD OF THE INVENTION

The present invention generally relates to transmitting contents data such as image data and/or voice data between or among transmission terminals.

BACKGROUND

With the need for reducing costs or times associated with business trips, more companies are moving towards transmission systems to have teleconference or videoconference among remotely located offices via a communication network. The transmission systems allow transmission of contents data such as image data and/or voice data among a plurality of transmission terminals that are remotely located from one another through the communication network such as a leased line and/or the Internet to facilitate communication among the plurality of transmission terminals.

While the Internet is widely used for the communication network as it is cost-effective, contents data may not be safely communicated through the Internet, for example, due to inappropriate settings of a router on the Internet. Further, since the band used for data communication tends to be unstable on the Internet, it has been difficult to keep the quality of image data or voice data to a certain level. In any case, the transmission systems may not be able to start communication, or communication being carried out by the transmission systems may be interrupted. When communication is interrupted, the user at the transmission terminal usually contacts an administrator of the transmission systems by other communication means, such as telephone or email, to ask for a solution to fix the problem. This requires substantial time before communication is resumed.

Japanese Patent Application Publication No. H7-162825 describes a system that monitors the communication line and each terminal unit, and upon detecting a fault, the system stores fault information regarding the detected fault. Further, when the detected fault is a heavy fault that may interrupt communication, the system calls a registered service office to notify of its fault conditions.

SUMMARY

While the system disclosed in Japanese Patent Application Publication No. H7-162825 automatically notifies the service office of the heavy fault, the user at each terminal still needs to wait until the user is able to start communication. Further, in case the system detects a fault other than the heavy fault, the fault information regarding the detected fault is not automatically sent to the service office such that the user at the terminal may need to contact the service office by other means.

In view of the above, the inventors of the present invention have realized that there is a need for a transmission system that allows a user at each terminal to communicate with a user at another terminal, even when the transmission system is not able to start communication or communication is interrupted.

Example embodiments of the present invention include an apparatus, method, system, computer program and product each capable of communicating contents data between a transmission terminal and a counterpart terminal through a first session, and transmitting management data from the transmission terminal to a management system. The transmission terminal obtains countermeasure data specifying an action to be taken by a user in response to a predetermined event that may prevent or interrupt communication with a user at the counterpart terminal, and transmits the countermeasure data from the transmission terminal to the counterpart transmission terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5A is an example data structure of a countermeasure data management table, managed by the terminal of FIG. 4;

FIG. 5B is an example data structure of a countermeasure data management table, managed by the terminal of FIG. 4;

FIG. 6 is an example data structure of a data quality management table, managed by the relay terminal of FIG. 4;

FIGS. 7A to 7C are illustrations for explaining image quality of image data transmitted or received by the transmission system of FIG. 1;

FIG. 8 is an example data structure of a relay terminal management table, managed by the transmission management apparatus of FIG. 4;

FIG. 9 is an example data structure of a terminal authentication management table, managed by the transmission management apparatus of FIG. 4;

FIG. 10 is an example data structure of a terminal management table, managed by the transmission management apparatus of FIG. 4;

FIG. 11 is an example data structure of a candidate list management table, managed by the transmission management apparatus of FIG. 4;

FIG. 12 is an example data structure of a session management table, managed by the transmission management apparatus of FIG. 4;

FIG. 13 is an example data structure of an address priority management table, managed by the transmission management apparatus of FIG. 4;

FIG. 14 is an example data structure of a transmission speed priority management table, managed by the transmission management apparatus of FIG. 4;

FIG. 15 is an example data structure of a quality management table, managed by the transmission management apparatus of FIG. 4;

FIG. 16 is an example data structure of a log management table, managed by the log management apparatus of FIG. 4;

FIG. 23 is a table storing priority points of the relay terminals that are respectively calculated by the transmission management apparatus of FIG. 4 during the operation of limiting a number of candidate relay terminals;

FIG. 30 is an illustration of example screens to be displayed by the terminal of the transmission system of FIG. 1.

Figure 1:
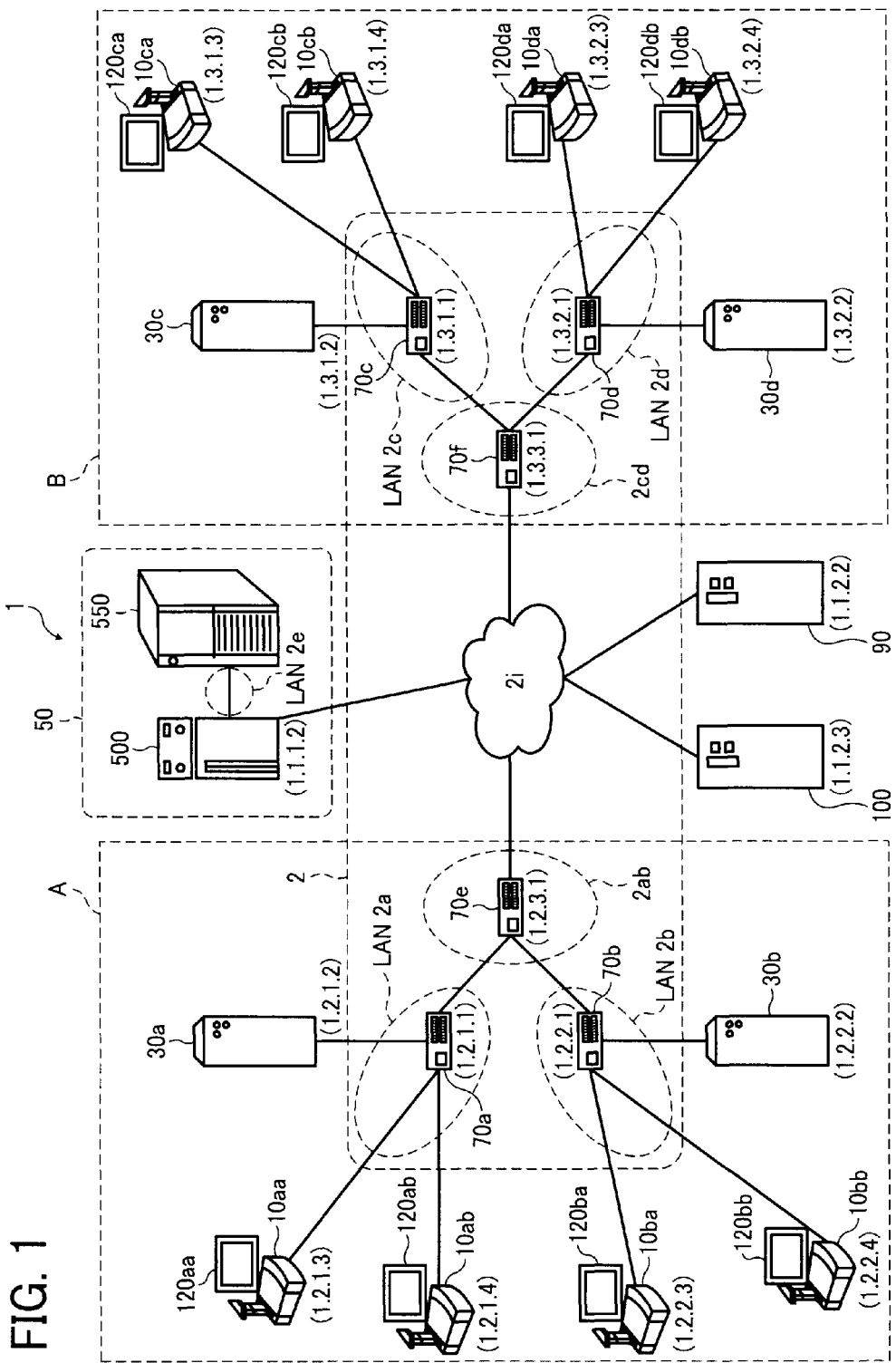
FIG. 1 is a schematic block diagram illustrating a transmission system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a transmission system 1 is explained according to an example embodiment of the present invention.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or voice data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes the plurality of transmission terminals 10*aa*, 10*ab*, 10*ba*, 10*bb*, 10*ca*, 10*cb*, 10*da*, and 10*db*, a plurality of displays 120*aa*, 120*ab*, 120*ba*, 120*bb*, 120*ca*, 120*cb*, 120*da*, and 120*db*, a plurality of relay terminals 30*a*, 30*b*, 30*c*, and 30*d*, the transmission management system 50 including a transmission management apparatus 500 and a log management apparatus 550, a program providing system 90, and a maintenance system 100.

For the descriptive purposes, in this example, any number of the plurality of terminals 10*aa* to 10*db* may be collectively or each referred to as the terminal 10. Any number of the plurality of displays 120*aa* to 120*db* may be collectively or each referred to as the display 120. Any one of the plurality of relay terminals 30*a*, 30*b*, 30*c*, and 30*d* may be collectively or each referred to as the relay terminal 30. The transmission management system 50 may be referred to as the "management system" 50. The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

The transmission terminal 10 transmits or receives contents data to or from another transmission terminal 10. Examples of contents data include, but not limited to, image data and/or voice data to be transmitted or received through a session established between or among the terminals 10 for communication. In this example, it is assumed that a moving image is transmitted as the image data. Alternatively, a still image, or both of the still image and the moving image, may be transmitted as the image data. The relay terminal 30 relays image data and/or voice data between or among the plurality of terminals 10. The transmission management system 50 centrally manages the transmission terminal 10 and the relay terminal 30.

The plurality of routers 70a to 70f, which may be collectively or each referred to as the router 70, selects a route that is most suitable for transmitting contents data such as image data and voice data.

The program providing system 90 includes a hard disk device (HD) 204 (FIG. 4), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program. In one example, the transmission management program may be mainly classified into a transmission management apparatus program to be installed onto the transmission management apparatus 500, and a log management program to be installed onto the log management apparatus 550.

The maintenance system 100 is implemented as a computer capable of maintaining, managing, fixing, or upgrading at least one of the terminal 10, relay terminal 30, management apparatus 500, log management apparatus 550, and program providing system 90. Assuming that the maintenance system 100 is provided within a country, and the terminal 10, the relay terminal 30, the management system 50, and the program providing system 90 are each installed outside the country, the maintenance system 100 maintains, manages, fixes, or upgrades at least one of the terminal 10, relay terminal 30, management apparatus 500, log management apparatus 550, and program providing system 90, remotely through the communication network 2. The maintenance system 100 may manage maintenance of at least one of the terminal 10, relay terminal 30, management apparatus 500, log management apparatus 550, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa and 10ab, the relay terminal 30a, and the router 70a are connected to a local area network (LAN) 2a. The terminals 10ba and 10bb, the relay terminal 30b, and the router 70b are connected to a LAN 2b. The LAN 2a and the LAN 2b are connected to a leased line 2ab in which the router 70e is provided. It is assumed that these devices including the terminals 10aa to 10bb are located in an area A. For example, assuming that the area A is any area in Japan, the LAN 2a could be located within an office in a city such as Tokyo, and the LAN 2b could be located within an office in another city such as Osaka.

The terminals 10ca and 10cb, the relay terminal 30c, and the router 70c are connected to a LAN 2c. The terminals 10da and 10db, the relay terminal 30d, and the router 70d are connected to a LAN 2d. The LAN 2c and the LAN 2d are connected to a leased line 2cd in which the router 70f is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70e and 70f.

The management system 50 and the program providing system 90 are connected through the Internet 2i to the terminal 10 and the relay terminal 30. The transmission management apparatus 500 and the log management apparatus 550 of the management system 50 are made communicable with each other through the LAN 2e. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the transmission management apparatus 500 of the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

<Hardware Structure of Transmission System>

Next, a hardware structure of the transmission system 1 is explained according to an example embodiment of the present invention. In this example, when any delay in data reception is observed at the counterpart terminal 10B or the relay terminal 30, the relay terminal 30 changes resolution of image data to obtain converted image data and sends the converted image data to the counterpart terminal 10B or the request terminal 10A.

Figure 29:
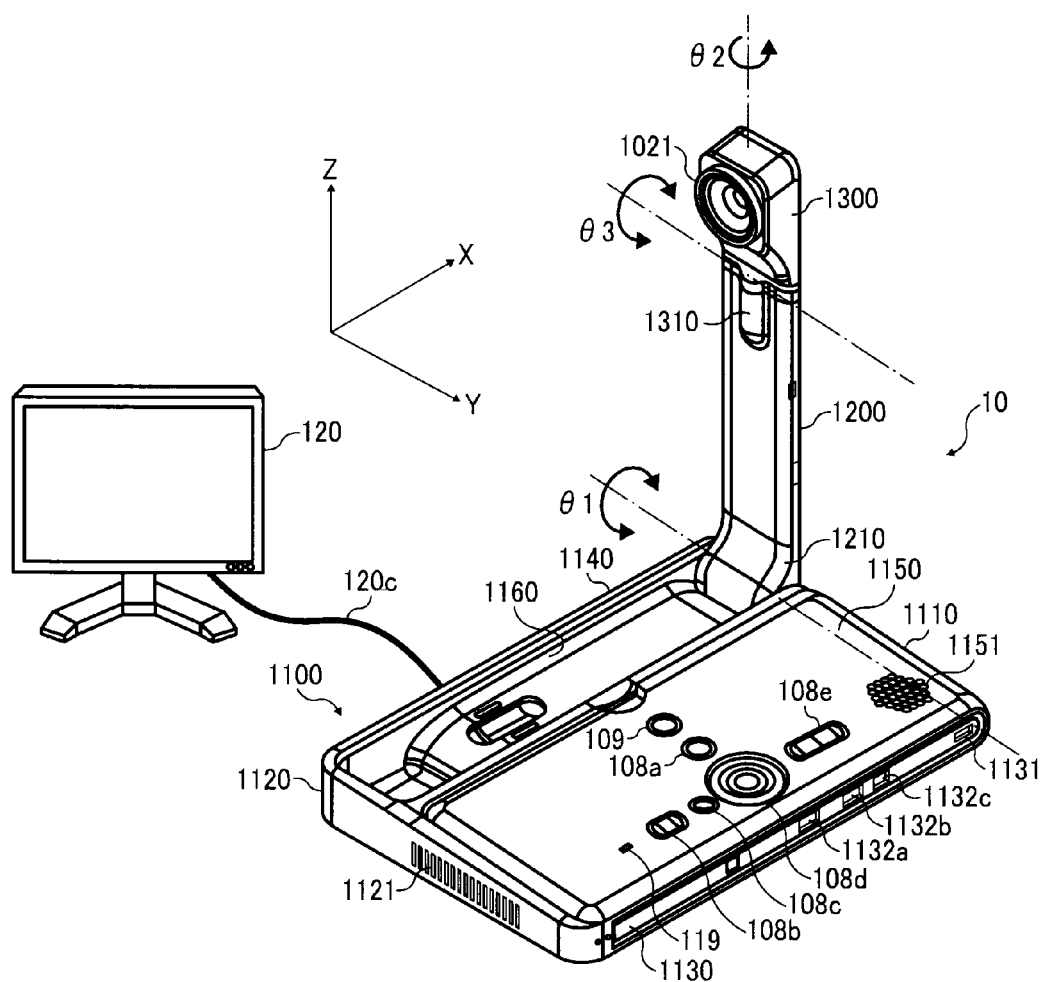
FIG. 29 is a perspective view illustrating the outer appearance of the terminal of the transmission system of FIG. 1, according to an example embodiment of the present invention.

FIG. 29 is a perspective view illustrating the outer appearance of the terminal 10 of the transmission system 1. In FIG. 29, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 29, the terminal 10 includes a body 1100, an arm 1200, and a camera housing 1300. The body 1100 includes a front side wall 1110 having a plurality of air intake holes that are formed over the nearly entire surface of the intake surface of the front side wall 1100. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 2) of the terminal 10 is able to catch sounds such as human voice or any sound including noise.

The body 1100 has an operation panel 1150, which is provided at a side toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 2) of the terminal 10 is able to output sounds such as sounds generated based on human voice. The body 1100 further includes a holder 1160, which is provided at a side toward the left side wall 1140. The holder 1160, which has a concave shape, accommodates therein the arm 1200 and the camera housing 1300. The right side wall 1130 of the body 1100 further includes a plurality of ports 1132a to 1132c (the ports 1132) each of which allows electric connections between an outside device connection interface (I/F) 118 (FIG. 2) and an outside device through a cable. The left side wall 1140 of the body 1100 is provided with a connection port for electrical connection between the outside device connection I/F 118 (FIG. 2) and a cable 120c for the display 120.

Figure 4:
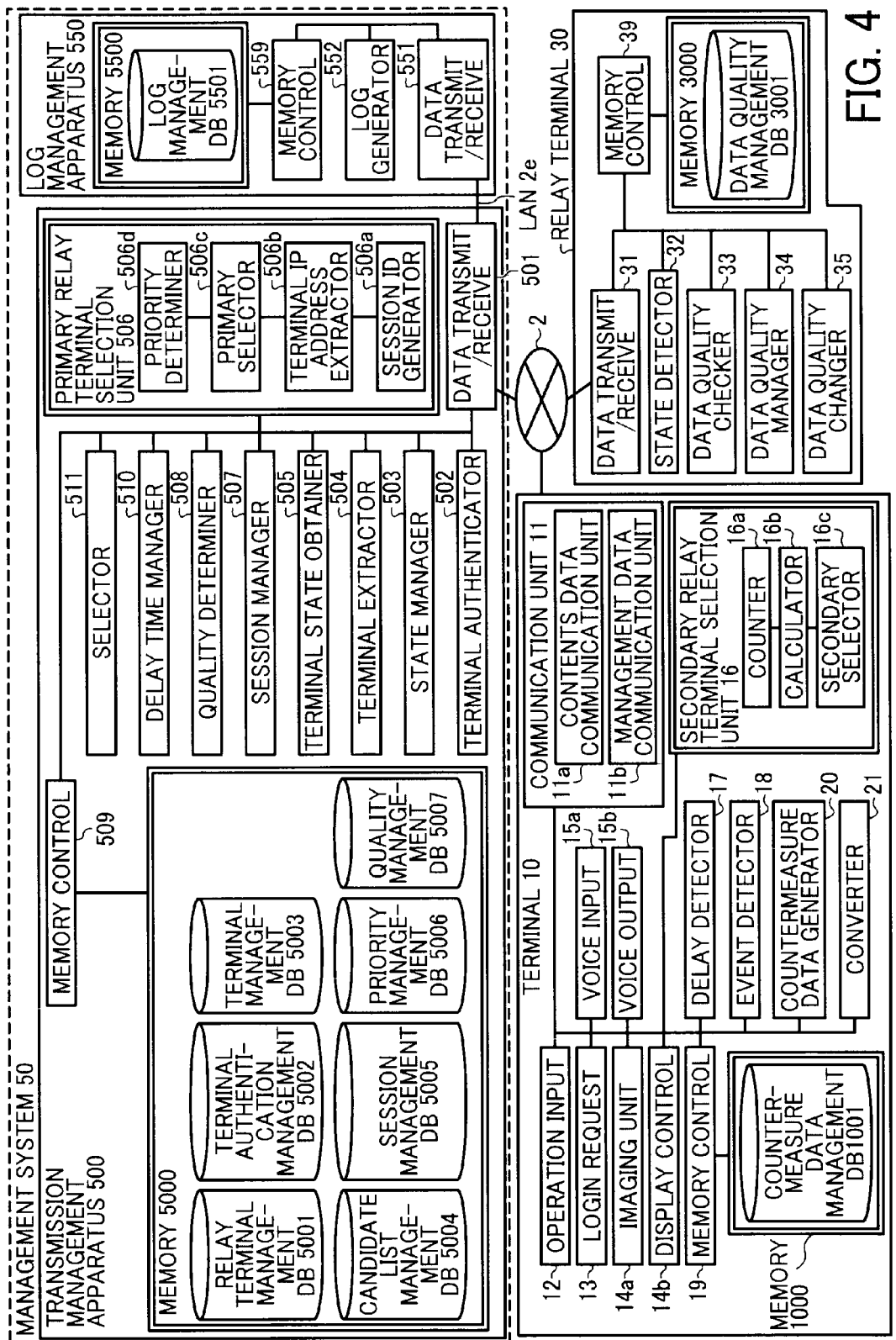
FIG. 4 is a schematic block diagram illustrating functional structures of the transmission management system, the terminal, and the relay terminal, of the transmission system of FIG. 1.

The arm 1200 is fixed to the body 1100 via a torque hinge 1210. With the torque hinge 1210, the arm 1200 can be rotated in directions of up and down with respect to the body 1100, while making a tilt angle θ1 of up to 135 degrees. FIG. 4 illustrates the case where the tilt angle θ1 is 90 degrees.

The camera housing 1300 incorporates therein a camera 112 (FIG. 2) that takes an image of an object. The object may be a part of a user, document, or a room where the terminal 10 is located. The camera housing 1300 is fixed to the arm 1200 through a torque hinge 1310. With the torque hinge 1310, the camera housing 1300 can be rotated with respect to the arm 1200, while making a pan angle θ2 from about −180 degrees to +180 degrees and a tilt angle θ3 that ranges from about −45 degrees to +45 degrees in the direction of up, down, right, and left. In FIG. 4, the pan angle θ2 and the tilt angle θ3 are each 0 degree.

The relay terminal 30, management apparatus 500, log management apparatus 550, program providing system 90 and maintenance system 100 are each implemented by a general-purpose computer such as a personal computer or a server computer. For simplicity, explanation of the outer appearance of the computer is omitted.

Figure 2:
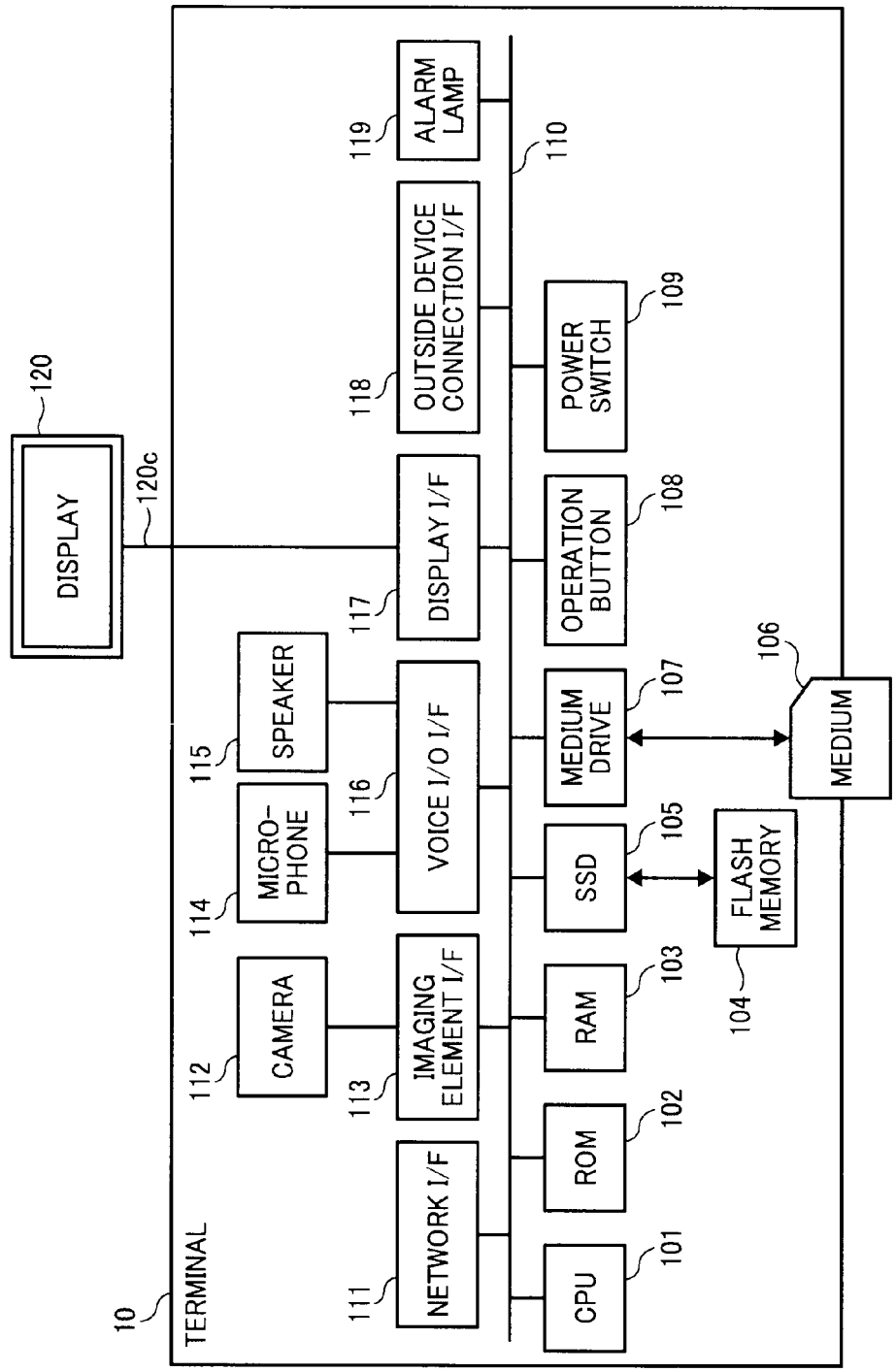
FIG. 2 is a schematic block diagram illustrating a hardware structure of a terminal of the transmission system of FIG. 1.

FIG. 2 illustrates a hardware structure of the terminal 10 according to an example embodiment of the present invention. The terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a voice input/output interface (I/O I/F) 116, a display interface (I/F) 117, the outside device connection interface (I/F) 118, and an alarm lamp 119, which are electrically connected through a bus 110 such as an address bus or data bus.

The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice. The speaker 115 outputs sounds such as sounds generated based on voice. The voice I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device such as the connection port described above referring to FIG. 29. The alarm lamp 119 notifies the user when a trouble is detected in the terminal 10.

The display 120 may be implemented by a liquid crystal display (LCD) or an organic light emitting display, which displays various data such as an image of an object or an operation icon. As illustrated in FIGS. 2 and 29, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as a camera, microphone, or speaker through a universal serial bus (USB) cable. When the outside camera is connected to the terminal 10, the CPU 101 causes the terminal 10 to capture an image using the outside camera, rather than the camera 112 that is incorporated in the terminal 10. When the outside microphone or the outside speaker is connected to the terminal 10, the CPU 101 causes the terminal 10 to use the outside microphone or the outside speaker in replace of the incorporated microphone 114 or the incorporated speaker 115. Alternatively, the CPU 101 may allow the user at the terminal 10 to use selected one of the outside device and the internal device.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 3:
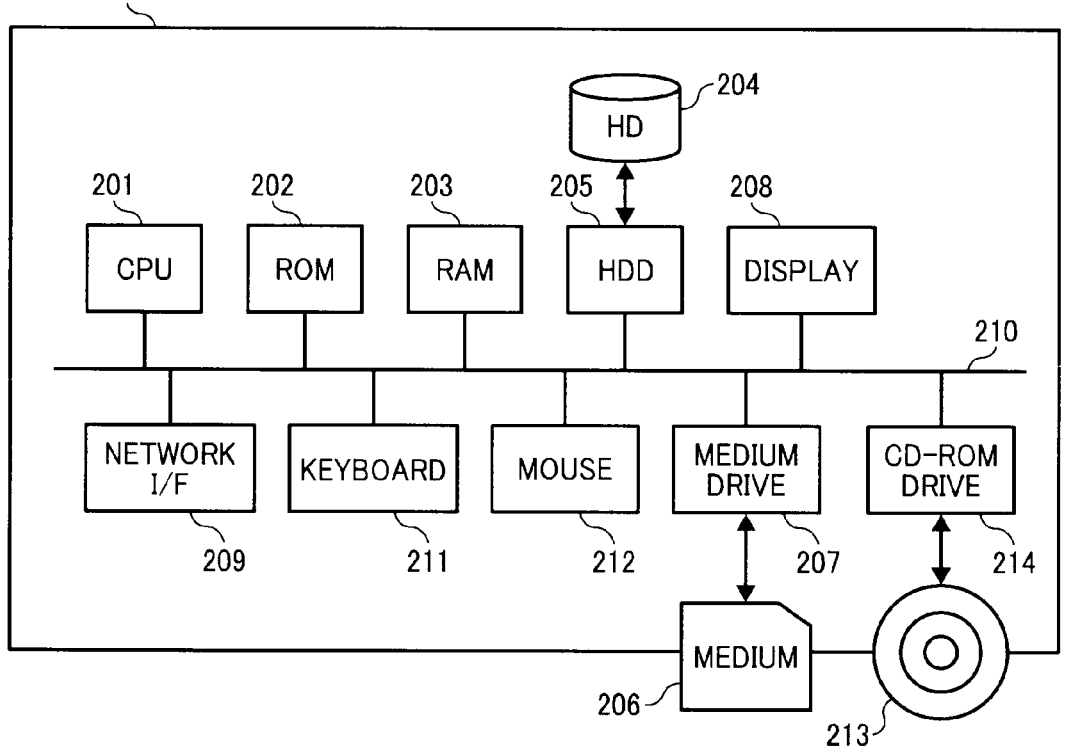
FIG. 3 is a schematic block diagram illustrating a hardware structure of any one of a transmission management apparatus, a relay terminal, a log management apparatus, a program providing system, and a maintenance system of the transmission system of FIG. 1.

FIG. 3 illustrates a hardware structure of the transmission management apparatus 500 of FIG. 1. The management apparatus 500 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management apparatus 500. The ROM 202 stores a control program for execution by the CPU 201, such as the communication control program. The RAM 203 functions as a work area of the CPU 201. The HD 204 stores therein various data such as a transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management apparatus 500 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management apparatus program may be written onto a recording medium that is readable by a general-purpose computer such as the recording medium 206 or the CD-ROM 213 in any format that is installable or executable by the general-purpose computer. Once the transmission management apparatus program is written onto the recording medium, the recording medium may be distributed. Further, the transmission management apparatus program may be stored in any desired memory other than the HD 204, such as the ROM 202.

The relay terminal 30 is substantially similar in hardware structure to the management apparatus 500 of FIG. 3, except for replacement of the transmission management apparatus program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management apparatus 500 of FIG. 3, except for replacement of the transmission management apparatus program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management apparatus 500 of FIG. 3, except for replacement of the transmission management apparatus program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

The log management apparatus 550 is substantially similar in hardware structure to the management apparatus 500 of FIG. 3, except for replacement of the transmission apparatus management program with a log management program that is used for controlling the log management apparatus 550. The log management program may be written onto a recording medium that is readable by a general-purpose computer such as the recording medium 206 or the CD-ROM 213 in any format that is installable or executable by the general-purpose computer. Once the log management program is written onto the recording medium, the recording medium may be distributed. Further, the log management program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Referring now to FIG. 4, a functional structure of the transmission system 1 of FIG. 1 is explained according to an example embodiment of the present invention. More specifically, FIG. 4 illustrates a functional structure of the transmission terminal 10, the relay terminal 30, and the transmission management system 50. As illustrated in FIG. 1, the terminal 10, the relay terminal 30, and the management system 50 exchange data with one another through the communication network 2. Further, the transmission management apparatus 500 and the log management apparatus 550 exchange data with one another through the LAN2e. In FIG. 4, the program providing system 90 and the maintenance system 100 of FIG. 1 are omitted.

<Functional Structure of Terminal>

The terminal 10 is provided with a function to establish a session to exchange contents data with another terminal. The terminal 10 further includes a function to transmit management data to the management system 50 that manages the communication state of the terminal 10 with another terminal 10. The management data includes session start management data used for changing the state of the terminal 10 to a communication start state, and session end management data used for changing the state of the terminal 10 to a communication end state. Referring to FIG. 4, the terminal 10 includes a communication unit 11, an operation input 12, a login request 13, an imaging unit 14a, a display control 14b, a voice input 15a, a voice output 15b, a secondary relay terminal selection unit 16, a delay detector 17, an event detector 18, a memory control 19, a countermeasure data generator 20, and a converter 21. These units shown in FIG. 4 correspond to a plurality of functions or functional modules, which are executed according to an instruction of the CPU 101 (FIG. 2) that is generated according to the terminal control program being loaded from the ROM 102 onto the RAM 103. The terminal 10 further includes a memory 1000 that may be implemented by the SSD 105 of FIG. 2.

(Countermeasure Data Management Table)

The memory 1000 includes a countermeasure data management database (DB) 1001, which includes a countermeasure data management table of FIGS. 5A and 5B. Referring to FIGS. 5A and 5B, the countermeasure data management table stores event data, event text data, countermeasure data, and voice data communication data, in association with one another.

The event data is used to uniquely identify a predetermined event, which can be detected by the event detector 18 of the request terminal 10A or the counterpart terminal 10B. More specifically, the event data stored in the table of FIG. 5A specifies a predetermined event that can be detected by the event detector 18 of the request terminal 10A. The event data stored in the table of FIG. 5B specifies a predetermined event that can be detected by the event detector 18 of the counterpart terminal 10B that communicates with the request terminal 10A.

Referring to FIGS. 5A and 5B, the event text data describes the event specified by the event data. The event text data may be displayed onto the display 120 of the terminal 10, when the event specified by the event data is detected by the event detector 18. The countermeasure data, which may be more than one, each specifies an action that can be taken by the user at the terminal 10 when the event specified by the event data is detected. The voice data communication data indicates whether voice data can be communicated between the request terminal 10A and the counterpart terminal 10B, when the event specified by the event data is detected. In this example, the voice data communication data "TRUE" indicates that voice data can be communicated, and the voice data communication data "FALSE" indicates that voice data cannot be communicated.

For example, the countermeasure data management table of FIG. 5A stores, for the event data "001" indicating the trouble in microphone detected by the request terminal 10A, the event text data indicating that the microphone of the request terminal 10A may be in trouble, the countermeasure data indicating that the user at the request terminal 10A will replace the microphone with a new microphone, the countermeasure data indicating that the user at the request terminal 10A requests a call from the user at the counterpart terminal 10B, and the voice data communication data indicating that voice data cannot be communicated. In operation, when the event specified by the event data "001" is detected at the request terminal 10A, the request terminal 10A causes the display 120 to display a message based on the event text data to notify the user at the request terminal 10A of the detected event. With this message displayed based on the event text data, the user at the request terminal 10A is able to know that the microphone error is detected. The request terminal 10A further causes the display 120 to display a message based on the countermeasure data to show one or more options that can be taken by the user to resume communication. With this message displayed based on the countermeasure data, the user at the request terminal 10A is able to select at least one of the options. The selected option is further transmitted to the counterpart terminal 10B such that the user at the counterpart terminal 10B is able to know the option taken by the user at the request terminal 10A.

The countermeasure data management table of FIG. 5B stores, for the event data "001" indicating the trouble in microphone detected by the counterpart terminal 10B, the event text data indicating that the microphone of the counterpart terminal 10B may be in trouble, the countermeasure data indicating that the user at the request terminal 10A will wait for a predetermined time, the countermeasure data indicating that the user at the request terminal 10A requests a call from the user at the counterpart terminal 10B, and the voice data communication data indicating that the voice data cannot be communicated. In operation, when the event specified by the event data "001" is detected at the counterpart terminal 10B, the request terminal 10A causes the display 120 to display a message based on the event text data to notify the user at the request terminal 10A of the detected event. With this message displayed based on the event text data, the user at the request terminal 10A is able to know that the microphone error is detected at the counterpart terminal 10B. The request terminal 10A further causes the display 120 to display a message based on the countermeasure data to show one or more options that can be taken by the user to resume communication. With this message displayed based on the countermeasure data, the user at the request terminal 10A is able to select at least one of the options. The selected option is further transmitted to the counterpart terminal 10B such that the user at the counterpart terminal 10B is able to know the option taken by the user at the request terminal 10A.

In alternative to managing the event data, event text data, countermeasure data, and voice data communication data in the form of one table as illustrated in FIGS. 5A and 5B, the memory 1000 may manage the event data, event text data, countermeasure data, and voice data communication data in the form of more than one table. For example, the memory 1000 may be provided with an event data table that stores the event data and the event text data for each one of the predetermined events that can be detected by the event detector 18, and a countermeasure data management table that stores the event data, the countermeasure data and the voice data communication data for each one of the predetermined events.

Further, one or more actions specified by the countermeasure data are not limited to the examples shown in FIGS. 5A and 5B. For example, the countermeasure data "PRESS O KEY" stored for the event data "003" and "004" may be replaced by the countermeasure data "PLEASE CALL".

<Functional Structure of Terminal>

Next, a functional structure of the terminal 10 is explained with reference to FIG. 4. The communication unit 11, which may be implemented by the network I/F 111 (FIG. 2), transmits or receives various data or information to or from another terminal, device, or system, through the communication network 2. In this example, the communication unit 11 of the terminal 10 includes a contents data communication unit 11a that transmits or receives contents data, and a management data communication unit 11b that transmits or receives management data.

The operations or functions of the operation input 12 of the terminal 10 of FIG. 4 are performed by the operation button 108 and the power switch 109 (FIG. 2) according to an instruction received from the CPU 101. The operation input 12 receives a user instruction input by the user through the operation button 108 or the power switch 109. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101. When the power of the terminal 10 is turned on, the login request 13 automatically causes the communication unit 11 to send login request information that requests the login process, and a current IP address of the terminal 10, to the management system 50 through the communication network 2. When the power of the terminal 10 is turned off according to a user instruction received from the user through the power switch 109, the login request 13 causes the communication unit 11 to send current state information of the terminal 10 to the management system 50, which indicates that the power of the terminal 10 is turned off. After the state information is sent, the operation input 12 turns off the power of the terminal 10. As the state information of the terminal 10 is sent every time the power is turned off, the management system 50 is able to know that the terminal 10 is off-line in realtime.

The operations or functions of the imaging unit 14a of the terminal 10 of FIG. 4 are performed by the camera 112 and the imaging element I/F 113 according to an instruction received from the CPU 101. The imaging unit 14 takes an image of an object to output image data of the object. The display control 14b may be implemented by the display I/F 117 (FIG. 2), and sends various data to the display 120 for display.

The operations or functions of the voice input 15a of the terminal 10 of FIG. 4 are performed by the microphone 114 and the voice input/output I/F 116 according to an instruction received from the CPU 101. After the microphone 114 converts voice of the user at the terminal 10 to a voice signal, the voice input 15a inputs the voice signal in the form of voice data. The operations or functions of the voice output 15b of the terminal 10 of FIG. 4 are performed by the speaker 115 and the voice input/output I/F 116 according to an instruction received from the CPU 101. The voice output 15b outputs a voice signal of voice data that is received from another terminal 10 through the speaker 115.

The secondary relay terminal selection unit 16 selects one of the relay terminals 30 that is suitable for communication to start videoconference. More specifically, according to an instruction received from the CPU 101 (FIG. 2), the secondary relay terminal selection unit 16 performs selection of the relay terminal 30 using a counter 16a, a calculator 16b, and a secondary selector 16c. The counter 16a obtains date and time information indicating the date and time at which the communication unit 11 of the terminal 10 receives preparatory transmit information when the preparatory transmit information is transmitted from another terminal 10. The calculator 16b calculates a time period T between the time when the preparatory information is transmitted by another terminal 10 and the time when the preparatory information is received at the terminal 10, based on the difference between the time and date information obtained by the counter 16a and time and date information included in the preparatory transmit information. The secondary selector 16c selects one of the relay terminals 30 having the minimum value of the time period T calculated by the calculator 16b.

The delay detector 17 detects a delay time ms indicating a time period in which contents data such as image data or voice data sent through the relay terminal 30 from another terminal 10 is delayed, according to an instruction received from the CPU 101 (FIG. 2).

The event detector 18 detects a predetermined event that may prevent or interrupt a user at the terminal 10 to have or continue communication with a user at another terminal 10. In this example, communication include transmission or reception of any desired data including, for example, messages, notice, and report, which may help to convey user's feelings.

More specifically, the predetermined event that may prevent or interrupt communication with a user at another terminal 10 includes any event that may prevent or interrupt transmission or reception of contents data such as image data or voice data due to the problem in hardware or software of the terminal 10 such that the user at the request terminal 10 is not able to communicate with another user at the counterpart terminal 10. As described above referring to FIG. 4, the predetermined event to be detected by the terminal 10 is stored in the table of FIGS. 5A and 5B.

Examples of the predetermined event include hardware troubles of the terminal 10, errors in operating system or firmware of the terminal 10, maintenance needs in operating system or firmware of the terminal 10, and network connection errors between the terminal 10 and the relay terminal 30.

The hardware troubles of the terminal 10 may be any trouble that may be caused in a device of the terminal 10 such as the camera 112, the microphone 114, the speaker 115, or the operation button 108. For example, when the firmware installed onto the terminal 10 detects any trouble when opening or controlling a device such as the camera 112, microphone 114, or speaker 115, the terminal 10 determines that an error in a specific device such as camera 112, microphone 114, or speaker 115 is detected. Alternatively, the event detector 18 determines that the predetermined event that may prevent or interrupt communication is detected, using the Application Program Interface (API) that controls a device through a device driver, or based on a state of the device obtained from error information returned by an event notification service. Alternatively, the event detector 18 may analyze data input to a device such as the camera 112 and/or microphone 114 to calculate a level of noise and/or voice input to the device. When the level of noise exceeds a threshold, or when the level of voice is lower than a threshold, the event detector 18 determines that a predetermined event that may prevent or interrupt communication is detected due to a specific device such as the camera 112 or microphone 114, for example, using a detection method described in Yasuhisa Niimi, Speech Recognition, Information Science Lecture E-19-3, Kyoritsu Publishing, Co., 1979, pp. 68-70, which is hereby incorporated herein by reference.

In another example, the event detector 18 determines that a predetermined event that may prevent or interrupt communication, which is caused by a trouble in the operation button 108, is detected, when the event detector 18 detects no user input through the operation button 108 for a predetermined time period counted from the time when the firmware of the terminal 10 is executed. In this example, the predetermined time period is set to 3 minutes. Alternatively, the event detector 18 may determine that the predetermined event caused by a trouble in the operation button 108 is detected, when the terminal 10 receives specific user input through the operation button 108. For example, the user may input one of the operation buttons 108 to notify the terminal 10 that the operation button 18 is not properly working.

Examples of errors in operating system include an error in device driver that controls the hardware of the terminal 10. As described above, the error in operating system may be detected based on error information of the API or the event notification service. Examples of the error information include, but not limited to, an error in reading or writing with respect to the HDD 205.

Examples of errors in firmware include an error in firmware that controls communication of the terminal 10 with the relay terminal 30. The error in firmware may be caused when the terminal 10 cannot be communicated with the relay terminal 30. For example, the relay terminal 30 may accidentally stop working, or the terminal 10 may not receive any response or parameters that are necessary for communication. In another example, the terminal 10 may receive a request or response not interpretable by the relay terminal 30 due to difference in firmware versions between the terminal 10 and the relay terminal 30.

The maintenance needs for the operating system or firmware may be detected when the operating system or firmware needs to be updated. Further, when a device such as the camera 112, microphone 114, or speaker 115 needs to be updated, the device may not properly work such that the device may not be executed. The error due to the maintenance needs for the device may be detected in a substantially similar manner as in the case the trouble in hardware is detected.

The error in network connections between the terminal 10 and the relay terminal 30 may be detected when contents data cannot be transmitted or received due to failure in settings of firewall or the router 70, or when contents data cannot be transmitted or received as the band of the communication network 2 becomes too narrow. The error in network connections between the terminal 10 and the relay terminal 30 may be treated in a substantially similar manner as described above referring to the case in which the error in firmware that controls communication of the terminal 10 with the relay terminal 30 is detected.

Alternatively, the event detector 18 may detect a predetermined event based on the time required for sending a packet obtained from a communication network stack of the transmission terminal 10, a packet loss indicating missing of data, or Bit Error Rate (BER). In one example, the event detector 18 may determine that a predetermined event that may prevent or interrupt communication is detected, when a number of data losses that has repeatedly occurred for an arbitrary time period reaches a predetermined number. In another example, the event detector 18 may determine that a predetermined event that may prevent or interrupt communication is detected, when a delay time obtained from the delay detector 17 reaches a predetermined value.

The countermeasure data generator 20 obtains countermeasure data indicating one or more actions that can be taken by the user at the terminal 10 for the detected event, for example, by reading out the countermeasure data that is stored with respect to the event data or by receiving a user instruction received through the microphone 114 or the operation button 108. The countermeasure data generator 20 further causes the display control 14b to display a message based on the countermeasure data.

The converter 21 converts voice data input through the microphone 114 to text data such as character data, for example, before transmitting the text data to the counterpart terminal 10B. The converter 21 converts text data such as character data, which is received by the communication unit 11 from the counterpart terminal 10B, to voice data for output through the speaker 115. The converter 21 converts between voice data and text data using any desired method including the sound recognition method described in L. Rabiner and B. H. Juang, Fundamentals of Speech Recognition, NTT Advance Technology, 1995, pp. 245-300, and the speech synthesis method described in Japanese Patent Application Publication Number S61-279898, each of which is hereby incorporated herein by reference.

The memory control 19 is implemented by the SSD 105 (FIG. 2) according to an instruction received from the CPU 101. The memory control 19 stores various data in the memory 1000, or read out various data from the memory 1000. The memory 1000 stores therein various data such as terminal identification (ID) information for identifying the terminal 10, a password for authenticating a user at the terminal 10, image data, and voice data. The memory 1000 overwrites its memory space to store image data and/or voice data every time the terminal 10 communicates with another terminal 10. Before overwriting image data with new image data, the memory control 19 reads out the image data for display on the display 120, and the voice data for output through the speaker 115.

In this example, any one of the terminal ID of the terminal 10 and the relay terminal ID of the relay terminal 30 includes any type of identification information that can be expressed by any language, character, symbol, mark, or any combination of language, character, symbol, and mark.

(Functional Structure of Relay Terminal)

Still referring to FIG. 4, a functional structure of the relay terminal 30 is explained. The relay terminal 30 includes a data transmit/receive 31, a state detector 32, a data quality checker 33, a data quality manager 34, a data quality changer 35, and a memory control 39. Upon execution, the CPU 201 (FIG. 3) loads the relay terminal control program from the HD 204 onto the RAM 203 to cause one or more of the units illustrated in FIG. 3 to perform functions or operations shown in FIG. 4. The relay terminal 30 further includes a memory 3000 that may be implemented by the HD 204 (FIG. 3).

(Data Quality Management Table)

The memory 3000 includes a data quality management database (DB) 3001, which stores a data quality management table illustrated in FIG. 6. The data quality management table of FIG. 6 stores an Internet protocol (IP) address of the counterpart terminal 10B to which image data is transmitted through the relay terminal 30, in association with quality of image data to be transmitted through the relay terminal 30 to the counterpart terminal 10B.

Referring now to FIGS. 7A to 7C, various image data having different resolution levels, which are respectively transmitted by the terminal 10 of the transmission system 1, are explained. Referring to FIG. 7A, the low-level resolution image data, which functions as a base image, has 160 pixels in the horizontal direction and 120 pixels in the vertical direction. Referring to FIG. 7B, the medium-level resolution image data has 320 pixels in the horizontal direction and 240 pixels in the vertical direction. Referring to FIG. 7C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with voice data.

For example, the data quality management table of FIG. 6 indicates that, in case of relaying image data to the counterpart terminal 10 having the IP address of "1.3.2.4", the quality of the image data to be relayed is high image quality.

<Functional Structure of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 4, are performed in relation to one or more hardware devices of the relay terminal 30 that are shown in FIG. 3.

The data transmit/receive 31 of FIG. 4 is implemented by the network I/F 209 of FIG. 3 according to an instruction received from the CPU 201. The data transmit/receive 31 transmits or receives various data or information to or from another terminal, device, or system through the communication network 2.

The state detector 32, which is implemented by the CPU 201 of FIG. 3, detects an operation state of the relay terminal 30. The operation state includes the on-line state ("ON LINE"), the off-line state ("OFF LINE"), the communicating state, the holding state, and the error state. The on-line state is a state in which the relay terminal 30 is turned on and available for data transmission/reception. The off-line state is a state in which the relay terminal 30 is not available for data transmission/reception, for example, as the power is not turned on. The communicating state is a state in which the relay terminal 30 is on-line, but is communicating with another terminal. The holding state is a state in which the relay terminal 30 is on-line, but is not available at least for temporarily. The error state is a state in which the relay terminal 30 is not available due to an error.

The data quality checker 33, which is implemented by the CPU 201 of FIG. 3, searches the data quality management DB 3001 (FIG. 6) using the IP address of the counterpart terminal 10B as a search key to extract information regarding the quality of image data suitable to communication with the counterpart terminal 10B. Based on the extracted information regarding the quality of image data, the relay terminal 30 determines the quality of image data to be transmitted to the counterpart terminal 10B.

The data quality manager 34, which may be implemented by the CPU 201 of FIG. 3, changes the contents of the data quality management DB 3001 based on the quality information that is received from the transmission management apparatus 500. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 3, changes the quality of image data received from the request terminal 10 to the quality of image data according to the contents of the data quality management DB 3001. The memory control 39 is implemented by the HDD 205 of FIG. 3 according to an instruction received from the CPU 201. The memory control 39 stores various data in the memory 3000, or reads out various data from the memory 3000.

<Functional Structure of Transmission Management Apparatus>

Next, a functional structure of the transmission management apparatus 500 is explained according to an example embodiment of the present invention. In this example, the operations or functions that are performed by the transmission management apparatus 500, which include the operations or functions performed by the units shown in FIG. 4, are performed in relation to one or more hardware devices of the transmission management apparatus 500 that are shown in FIG. 3. Referring to FIG. 4, the transmission management apparatus 500 includes a data transmit/receive 501, a terminal authenticator 502, a state manager 503, a terminal extractor 504, a terminal state obtainer 505, a primary relay terminal selection unit 506, a session manager 507, a quality determiner 508, a memory control 509, a delay time manager 510, and a selector 511. Upon execution, the CPU 201 (FIG. 3) loads the transmission management apparatus program from the HD 204 onto the RAM 203 to cause the units shown in FIG. 3 to perform operations or functions as illustrated in FIG. 4. The transmission management apparatus 500 further includes a memory 5000, which may be implemented by the HD 204 of FIG. 3.

(Relay Terminal Management Table)

The memory 5000 includes a relay terminal management database (DB) 5001, which stores therein a relay terminal management table of FIG. 8. The relay terminal management table of FIG. 8 stores, for each relay terminal ID of the terminal 30, the operation state of the relay terminal 30, the received date and time at which the transmission management apparatus 500 receives the state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the transmission management apparatus 500 receives the state information is "13:00 PM of Nov. 10, 2009", the IP address of the relay terminal 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 9. The terminal authentication management table of FIG. 9 stores a plurality of terminal IDs respectively assigned to the terminals 10 that are managed by the management system 50, in association with a plurality of passwords that are previously determined for the respective terminals 10. For example, referring to the terminal authentication management table of FIG. 9, the terminal 10aa having the terminal ID "01aa" is assigned with the password "aaaa".

(Terminal Management Table)

The memory 5000 further includes a terminal management database (DB) 5003, which stores a terminal management table of FIG. 10. The terminal management table of FIG. 10 stores, for each one of the terminal IDs assigned to the terminals 10, the terminal name to be used for communication with the terminal 10, the operation state of the terminal 10, the received date and time at which the transmission management apparatus 500 receives the login request information from the terminal 10, and the IP address of the terminal 10. For example, for the terminal 10aa having the terminal ID "01aa", the terminal management table of FIG. 10 indicates that the terminal name is "Japan Tokyo Office AA terminal", the operation state is on-line ("ON LINE") and is available for communication ("OK"), the received date and time is "13:40 PM, Nov. 10, 2009", and the IP address of the terminal 10aa is "1.2.1.3".

(Candidate List Management Table)

The memory 5000 further includes a candidate list management database (DB) 5004, which stores a candidate list management table of FIG. 11. The candidate list management table of FIG. 11 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the transmission system 1 of FIG. 1 are previously registered as the candidate terminal 10. For example, the candidate list management table of FIG. 11 indicates that the request terminal 10aa having the terminal ID "01aa" is most likely to request for videoconference with respect to the terminal 10ab having the terminal ID "01ab", the terminal 10ba having the terminal ID "01ba", the terminal 10bb having the terminal ID "01bb", and the terminal 10db having the terminal ID "01db". The management apparatus 500 manages the candidate list management table of FIG. 11, for example, according to a user instruction received from any one of the terminals 10. For example, in response to a user instruction received from the terminal 10aa, the transmission management apparatus 500 may add or delete the contents of the candidate list management table.

(Session Management Table)

The memory 5000 further includes a session management database (DB) 5005, which stores a session management table of FIG. 12. The session management table of FIG. 12 stores information regarding each of the sessions that are carried out by at least two terminals 10 of the transmission system 1 for the purpose of selecting the relay terminal 30 that is most suitable for communication between at least two terminals 10. More specifically, for each session ID that uniquely identifies each session, the session management table of FIG. 12 stores a relay terminal ID of the relay terminal 30 to be used for transmitting or receiving contents data such as image data and voice data, a terminal ID of the request terminal 10A, a terminal ID of the counterpart terminal 10B, a delay time ms indicating a time period required for receiving contents data at the counterpart terminal 10B, the date and time information indicating the time at which the transmission management apparatus 500 receives delay information from the counterpart terminal 10B. For example, referring to the session management table of FIG. 12, for the session having the session ID "se1", the relay terminal 30a having the relay terminal ID "111a" is selected to relay contents data between the request terminal 10aa having the terminal ID "01aa" and the counterpart terminal 10db having the terminal ID "01db". Further, the transmission management apparatus 500 receives the delay information from the counterpart terminal 10db at 14:00 PM, Nov. 10, 2009. Based on this date and time information, the delay time ms of 200 milliseconds (ms) is obtained. In case of having videoconference between only two terminals 10, the delay time may be determined based on the time when the management apparatus 500 receives the delay information transmitted from the request terminal 10A rather than based on the time when the management apparatus 500 receives the delay information transmitted from the counterpart terminal 10B. In case of having videoconference with more than two terminals 10, the delay information transmitted from the counterpart terminal 10B that receives the contents data is used to manage the date and time at which the delay information is received.

(Address Priority Management Table)

The memory 5000 further includes a priority management database (DB) 5006, which stores an address priority management table of FIG. 13. The address priority management table of FIG. 13 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 13, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30. More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

(Transmission Speed Priority Management Table)

The priority management DB 5006 of the memory 5000 further includes a transmission speed priority management table of FIG. 14. The transmission speed priority management table of FIG. 14 stores a range of the maximum data transmission speeds in association with a transmission speed priority point. More specifically, the transmission speed priority management table of FIG. 14 indicates that the transmission speed priority point increases with the increase in value of the maximum data transmission speeds at the relay terminal 30. For example, referring to FIG. 14, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

(Quality Management Table)

The memory 5000 further includes a quality management database (DB) 5007, which stores a quality management table of FIG. 15. The quality management table of FIG. 15 stores the delay time ms of image data in association with the quality of image data. More specifically, the quality management table of FIG. 15 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

The data transmit/receive 501, which may be implemented by the network I/F 209 (FIG. 3) according to an instruction received from the CPU 201, transmits or receives various data or information to or from another terminal, device, or system through the communication network 2 that may include the LAN 2e.

Under control of the CPU 201 (FIG. 3), the terminal authenticator 502 obtains a terminal ID and a password from the login request information that is received from the data transmit/receive 501. Using the terminal ID and the password as a search key, the terminal authenticator 502 searches the terminal authentication management DB 5002 to determine whether the obtained set of terminal ID and password is registered. Based on the search result, the terminal authenticator 502 determines whether the user at the terminal 10 or the terminal 10 is allowed for access.

The state manager 503, which operates according to an instruction received from the CPU 201 (FIG. 3), manages the operation state of the request terminal 10A that sends the login request information using the terminal management DB 5003 (FIG. 10). More specifically, the state manager 503 stores the terminal ID of the request terminal 10A, the operation state of the request terminal 10A, the date and time at which the management apparatus 500 receives the login request information from the request terminal 10A, and the IP address of the request terminal 10A.

The terminal extractor 504, which operates according to an instruction received from the CPU 201 (FIG. 3), searches the candidate list management DB 5004 (FIG. 11) using the terminal ID of the request terminal 10A as a key to obtain a list of terminal IDs each being assigned to a plurality of candidate terminals 10. Additionally, the terminal extractor 504 searches the candidate list management DB 5004 (FIG. 11) using the terminal ID of the request terminal 10A as a key to obtain a terminal ID of another request terminal 10A that registers the request terminal 10A as a candidate terminal for another request terminal 10A.

The terminal state obtainer 505, which operates under control of the CPU 201 (FIG. 3), searches the terminal management DB 5003 (FIG. 10) using the terminal ID of each candidate terminal 10 that is extracted by the terminal extractor 504 as a key to obtain the state information of each candidate terminal 10. Accordingly, the terminal state obtainer 505 obtains the operation state of each of the candidate terminal 10 that is previously determined for the request terminal 10A that sends the login request information. Further, the terminal state obtainer 505 searches the terminal management DB 5003 using the terminal ID extracted by the terminal extractor 504 as a key to obtain the state information of the request terminal 10A that sends the login request information.

The primary relay terminal selection unit 506, which operates according to an instruction received from the CPU 201 (FIG. 3), limits a number of relay terminals 30 each of which is a candidate relay terminal 30 that may be used for relaying contents data between at least two terminals 10. Based on the result obtained by the primary relay terminal selection unit 506, the secondary relay terminal selection unit 16 of the terminal 10 selects one terminal 30 that is most suitable for communication between at least two terminals 10. As illustrated in FIG. 4, the primary relay terminal selection unit 506 includes a session ID generator 506a, a terminal IP address extractor 506b, a primary selector 506c, and a priority determiner 506d.

The session ID generator 506a of the primary relay terminal selection unit 506 generates a session ID for identifying a session that is used for selecting the relay terminal 30. The terminal IP address extractor 506b extracts the terminal ID of the request terminal 10A and the terminal ID of the counterpart terminal 10B respectively from the session request information received from the request terminal 10A, and searches the terminal management DB 5003 (FIG. 10) to obtain the IP address of the request terminal 10A and the IP address of the counterpart terminal 10B. The primary selector 506c selects one or more relay terminals 30 having the online state from the relay terminal management DB 5001 (FIG. 8) to obtain the relay terminal ID of the selected relay terminal 30. In this example, it is assumed that more than two relay terminals 30 are selected as having the on-line state.

Further, the primary selector 506c obtains the IP address of each of the selected relay terminals 30. Once the IP address of the relay terminal 30 is obtained for each relay terminal 30, the primary selector 506c compares the IP address of the relay terminal 30 with at least one of the IP address of the request terminal 10A and the IP address of the counterpart terminal 10B that are respectively obtained by the terminal IP address extractor 506b to analyze the degree of similarity between the IP address of the terminal 10 and the IP address of the relay terminal 30. More specifically, the primary selector 506c compares between the IP address of the terminal 10 and the IP address of the relay terminal 30, digit by digit, or dot address by dot address, to determine the degree of similarity. Using the address priority management table of FIG. 13, the primary selector 506c obtains the address priority point for each one of the relay terminals 30. Assuming that the primary selector 506c compares the IP address of the terminal 10 with the IP address of the relay terminal 30, respectively for the request terminal 10A and the counterpart terminal 10B, the primary selector 506c obtains two address priority points for each one of the relay terminals 30. In such case, the primary selector 56c selects the highest one of the address priority points as the address priority point for the relay terminal 30.

Additionally, for each of the selected relay terminals 30 having the on-line state, the primary selector 506c obtains the maximum data transmission speed of the relay terminal 30 from the relay terminal management table of FIG. 8. Using the transmission speed priority management table of FIG. 14, the primary selector 506c obtains the transmission speed priority point that corresponds to the maximum data transmission speed of the selected relay terminal 30, for each of the selected relay terminals 30.

For each of the relay terminals 30, the primary selector 506c obtains a total priority point by adding the address priority point and the transmission speed priority point together. In this example, the primary selector 506c selects two relay terminals 30 including the relay terminal 30 having the highest total priority point and the relay terminal 30 having the second highest total priority point.

In this example, a number of relay terminals 30 that is finally selected by the primary selector 506c is not limited to two such that more than two relay terminals 30 may be finally selected for further processing as long as a number of relay terminals 30 is sufficiently reduced.

The priority determiner 506d refers to the priority management DB 5006 (FIG. 13) to determine the address priority point for each one of the relay terminals 30 that is selected by the primary selector 506c. The priority determiner 506d obtains the maximum data transmission speed of the relay terminal 30 from the relay terminal management DB 5001 (FIG. 8), and refers to the priority management DB 5006 (FIG. 14) to obtain the transmission speed priority point of the relay terminal 30 that is selected by the primary selector 506c.

Referring back to FIG. 4, the session manager 507, which operates according to an instruction received from the CPU 201, stores the session ID generated by the session ID generator 506a, the terminal ID of the request terminal 10A, and the terminal ID of the counterpart terminal 10B, in a corresponding manner, in the session management DB 5005 (FIG. 12) of the memory 5000. The session manager 507 further stores the relay terminal ID of the relay terminal 30 that is finally selected by the secondary selector 16c of the terminal 10 for each session ID, in the session management DB 5005 (FIG. 12).

The quality determiner 508, which operates according to an instruction received from the CPU 201 (FIG. 3), searches the quality management DB 5007 (FIG. 15) using the delay time ms obtained for the selected relay terminal 30 to obtain the image data quality that is desirable for communication using the relay terminal 30.

The memory control 509, which operates according to an instruction received from the CPU 201 (FIG. 3) in relation with the HDD 205 (FIG. 3), stores various data in the memory 5000 or read out various data from the memory 5000.

The delay time manager 510 searches the terminal management DB 5003 (FIG. 10) using the IP address of the counterpart terminal 10B to obtain the terminal ID of the counterpart terminal 10B. The delay time manager 510 further manages the session management table of FIG. 12 stored in the session management DB 5005 so as to keep updated the value stored in the "delay time" field for the obtained terminal ID of the counterpart terminal 10B.

The selector 511 receives the countermeasure data from the terminal 10, and selects one of the relay terminals 30 for relaying contents data to be replaced with a relay terminal 30 that is currently in use.

<Functional Structure of Log Management Apparatus>

Next, a functional structure of the log management apparatus 550 is explained according to an example embodiment of the present invention. The log management apparatus 550 is provided with a function of receiving session start management data and session end management data for a session through which contents data is communicated between terminals, and managing time required for communication. The log management apparatus 550 includes a data transmit/receive 551, a log generator 552, and a memory control 559. In this example, the operations or functions that are performed by the log management apparatus 550, which include the operations or functions performed by the units shown in FIG. 4, are performed in relation to one or more hardware devices of the log management apparatus 550 that are shown in FIG. 3, according to an instruction from the CPU 201 according to the program stored in the ROM 202. The log management apparatus 550 further includes a memory 5500, which may be implemented by the HD 204 of FIG. 3.

(Log Management Table)

The memory 5500 includes a log management DB 5501, which stores a log management table of FIG. 16. The log management table stores, for each one of the plurality of terminal IDs of the terminals 10, identification information of log data that is referred to as a log ID, management data, a session ID, and time data in association with one another. In this example, the management data is used to determine whether any change to a communication state between or among the terminals 10 is necessary. Examples of the management data include, but not limited to, session start management data "invite" indicating the start of a session for communicating contents data between the terminals 10, session end management data "bye" indicating the end of a session for communicating contents data between the terminals 10, login management data "log in" indicating the login process of the terminal 10, logout management data "log out" indicating the log out process of the terminal 10, cancel management data "cancel" indicating cancellation of the previous request, error management data "error" indicating the detection of an error, fault management data "fault" indicating the detection of a fault, maintenance management data "maintenance" indicating maintenance operation, etc. The session ID is any identification information for uniquely identifying a session through which contents data is communicated between the terminals 10. The time data indicates the time at which each log data is registered to the log management table. In this example, the log management apparatus 550 obtains the time data to be stored in the log management table of FIG. 16 when the management data is received from the terminal 10.

The data transmit/receive 551, which is implemented by the network I/F 209 (FIG. 3), allows transmission of various data or information with the transmission management apparatus 500 through the LAN 2e. The log generator 552 extracts information to be managed by the log management apparatus 550 from various data or information received from the transmission management apparatus 500 to generate log data. The memory control 559, which may be implemented by the HDD 205 of FIG. 3, stores various data to the memory 5500 or read out various data from the memory 5500.

<Operations of Transmission System>

Figure 17:
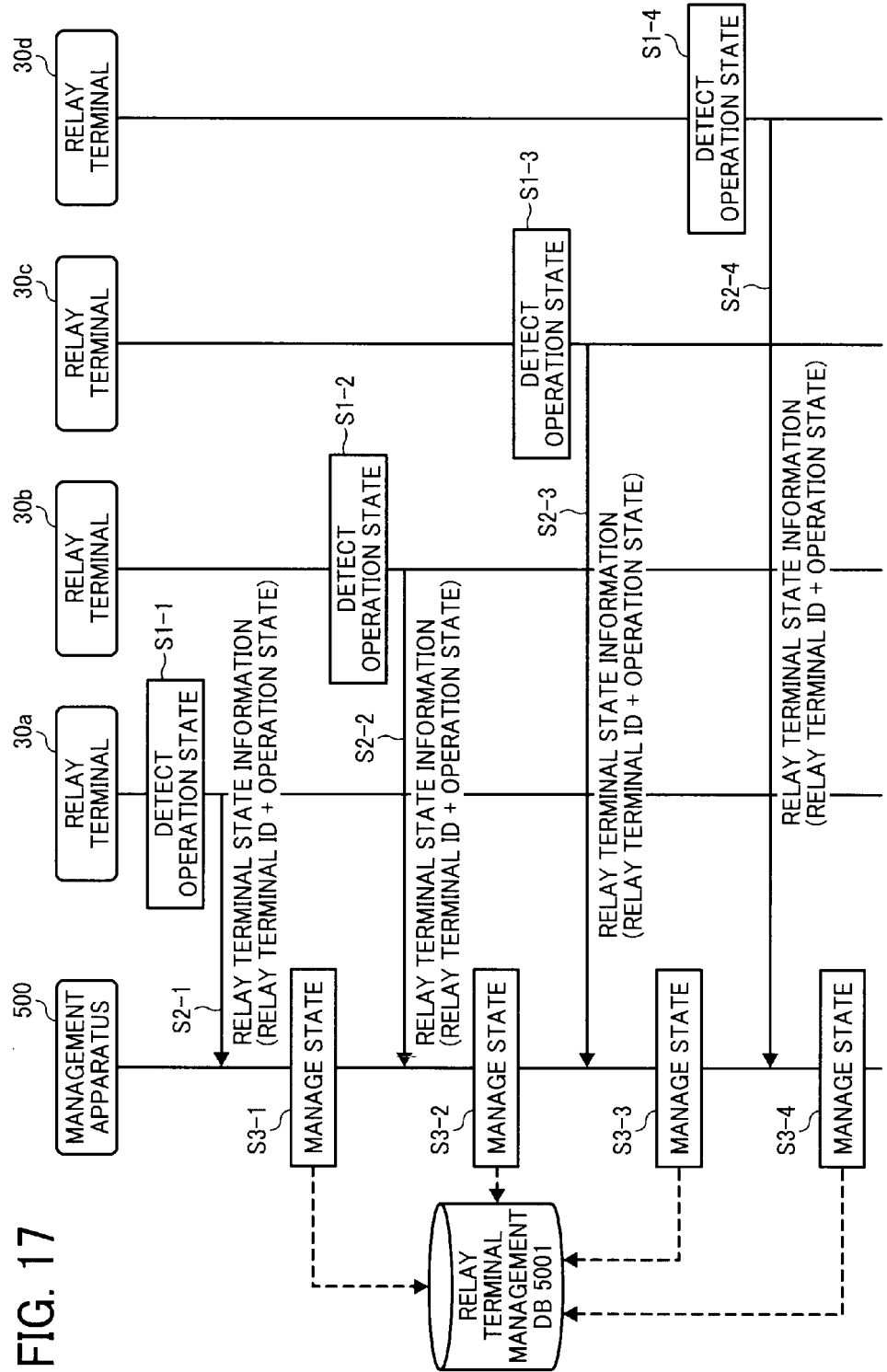
FIG. 17 is a data sequence diagram illustrating operation of managing state information indicating an operation state of the relay terminal of the transmission system of FIG. 1, according to an example embodiment of the present invention.
Figure 18:
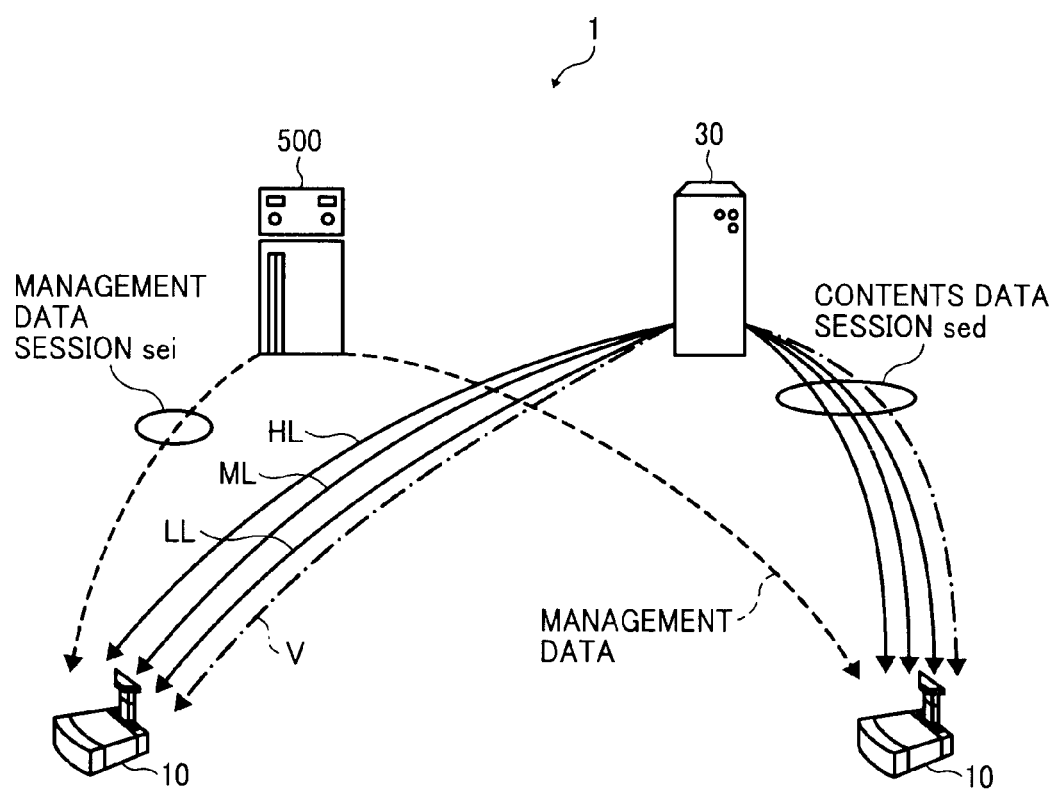
FIG. 18 is an illustration for explaining transmission or reception of data such as image data, voice data, or management data, performed by the transmission system of FIG. 1.
Figure 19:
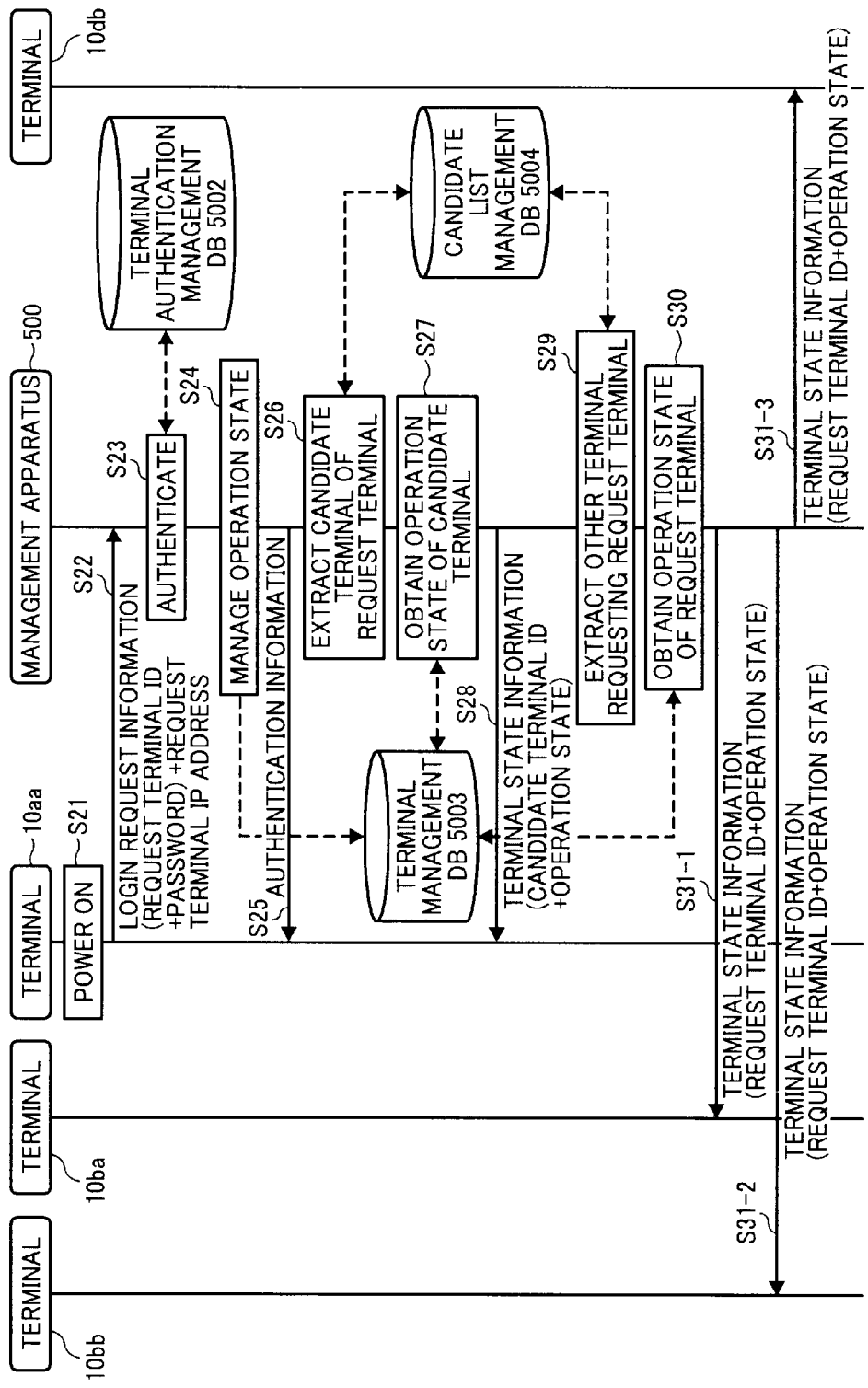
FIG. 19 is a data sequence diagram illustrating operation of establishing communication among two or more transmission terminals of the transmission system of FIG. 1, according to an example embodiment of the present invention.
Figure 20:
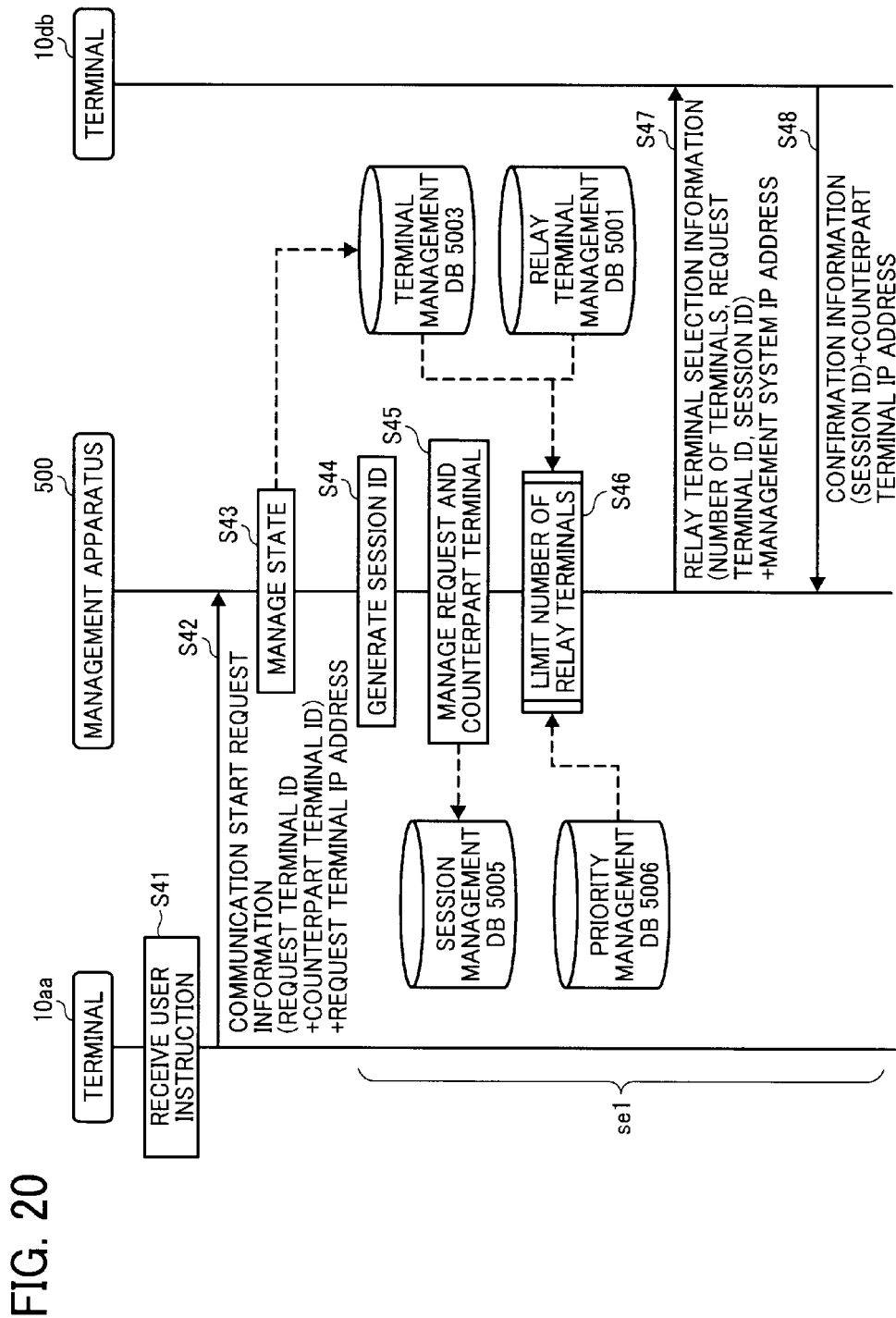
FIG. 20 is a data sequence diagram illustrating operation of limiting a number of candidate relay terminals, performed by the transmission system of FIG. 1.
Figure 21:
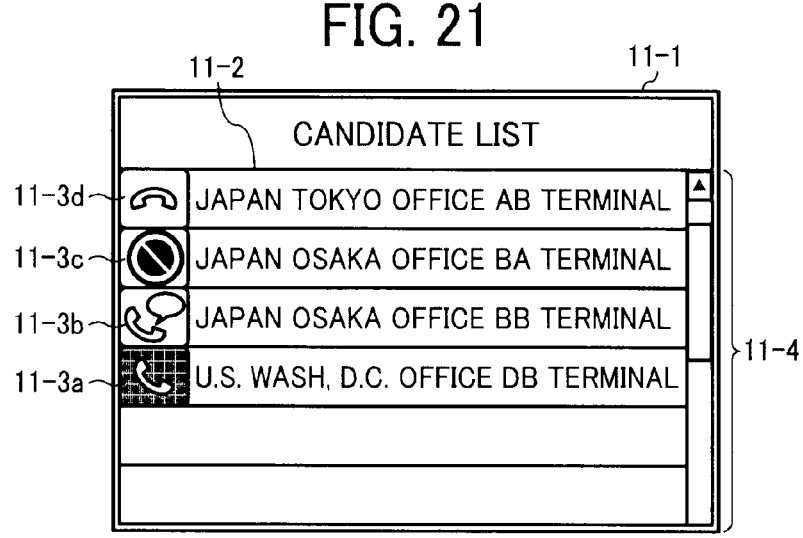
FIG. 21 is an example candidate list, displayed by the terminal of FIG. 4.
Figure 22:
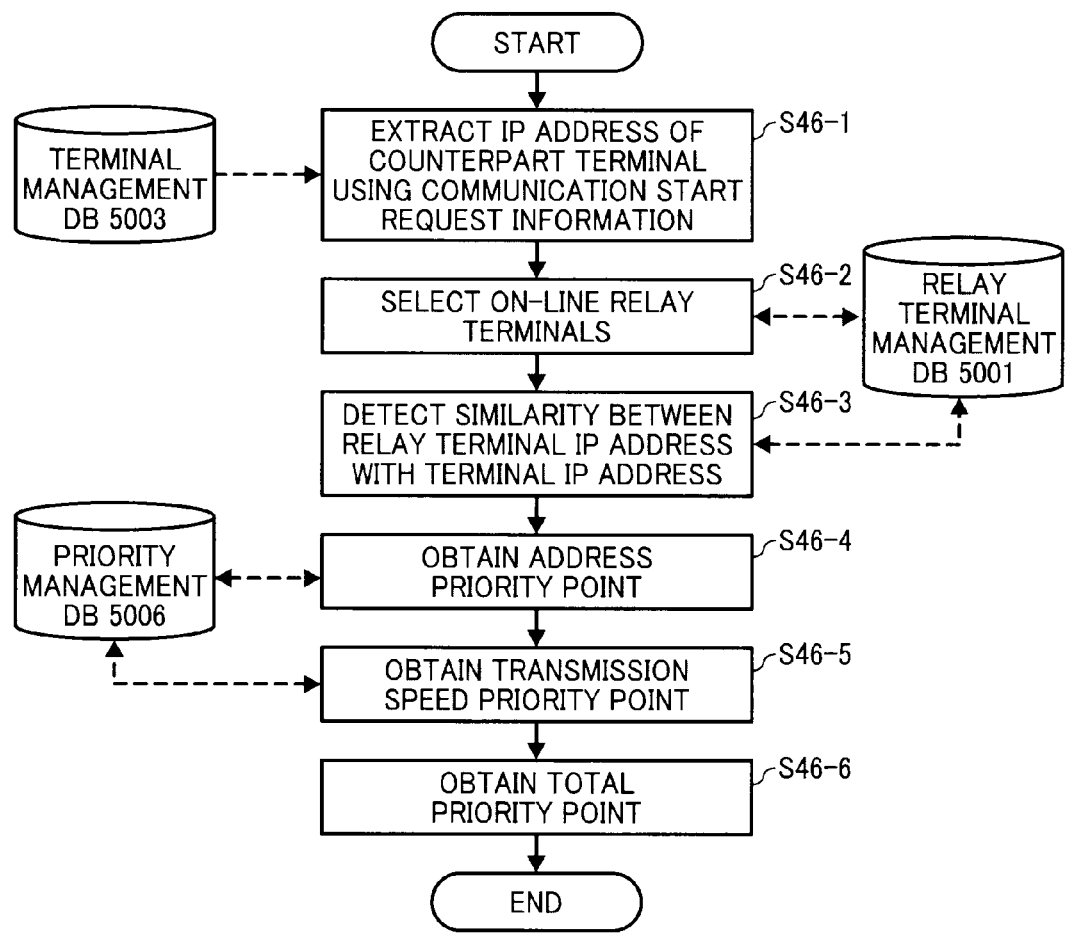
FIG. 22 is a flowchart illustrating operation of limiting a number of candidate relay terminals, performed by the transmission management apparatus of FIG. 4.
Figure 24B:
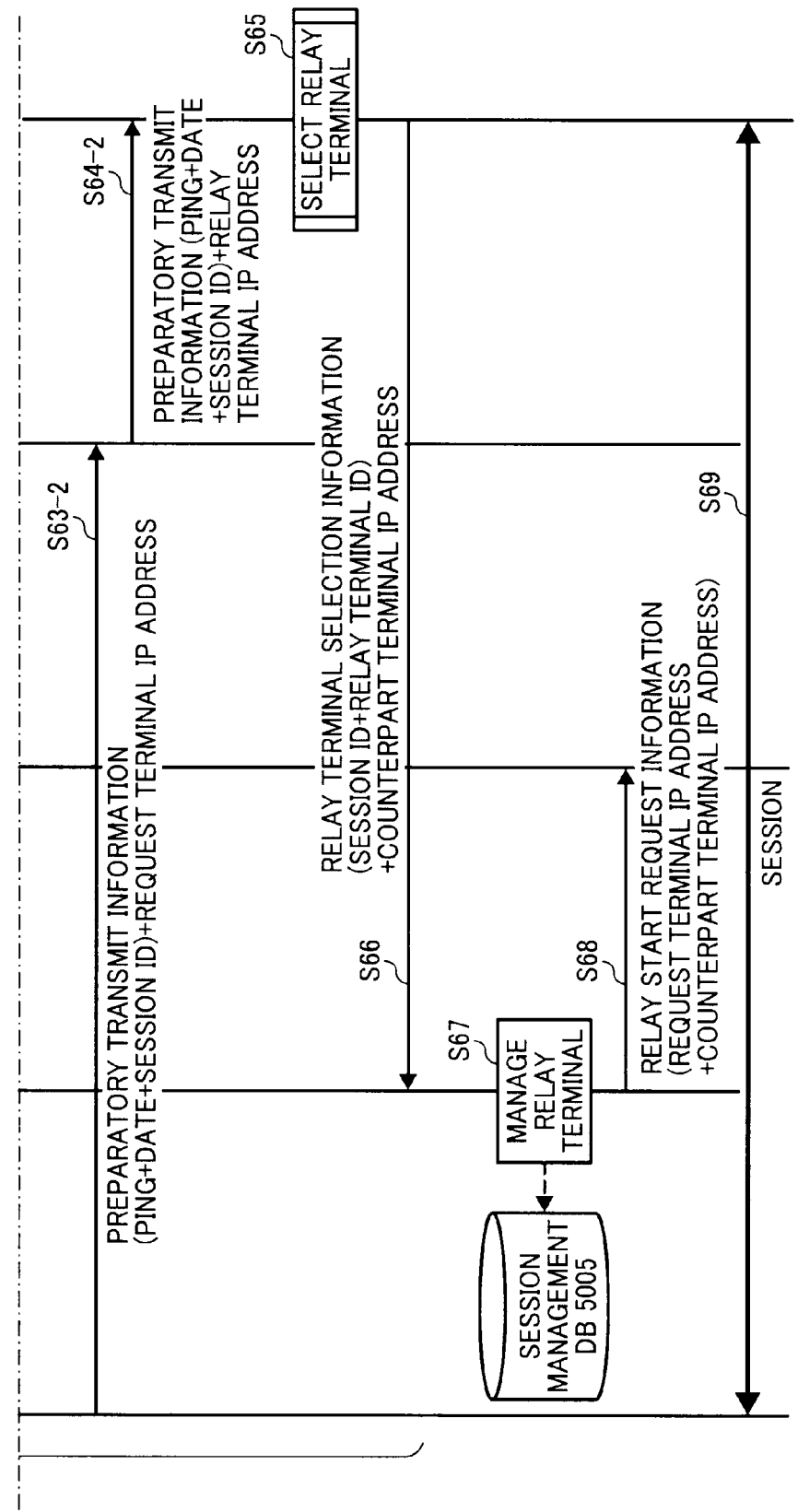
FIG. 24 is a data sequence diagram illustrating operation of selecting a relay terminal, performed by the transmission system of FIG. 4.
Figure 25:
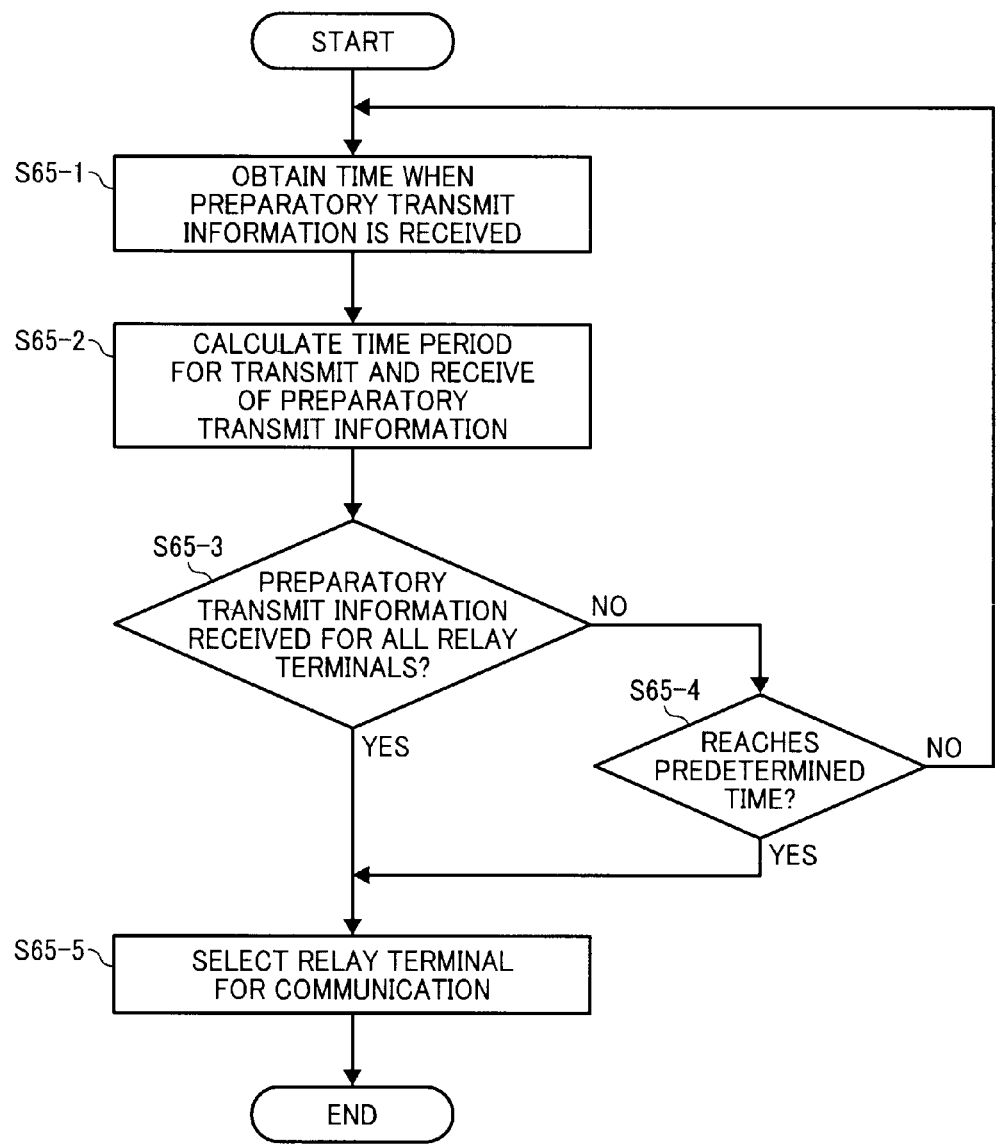
FIG. 25 is a flowchart illustrating operation of selecting a relay terminal, performed by the transmission terminal of FIG. 4.
Figure 26:
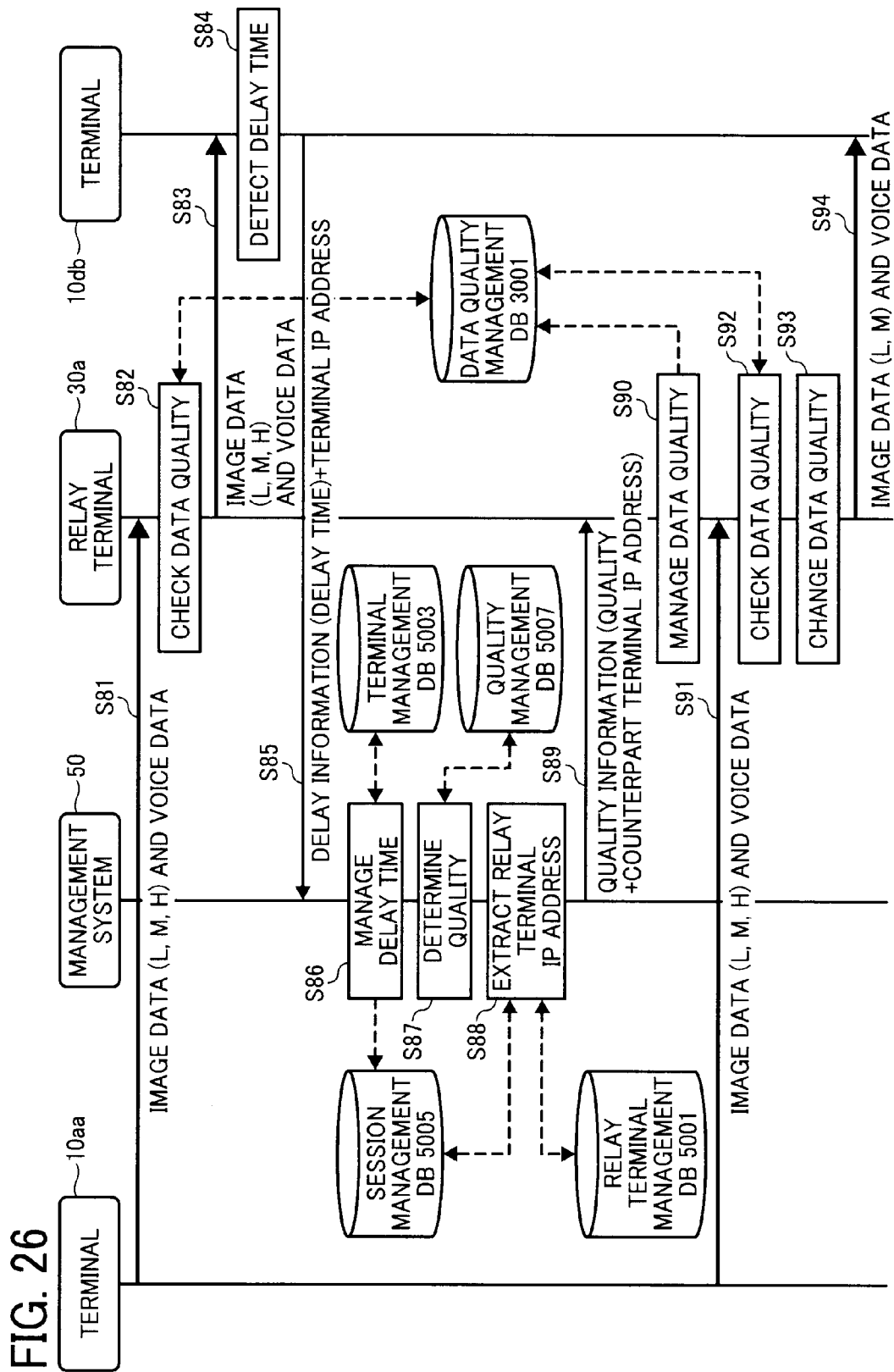
FIG. 26 is a data sequence diagram illustrating operation of transmitting or receiving data such as image data and voice data, performed by two or more transmission terminals of the transmission system of FIG. 1.
Figure 27:
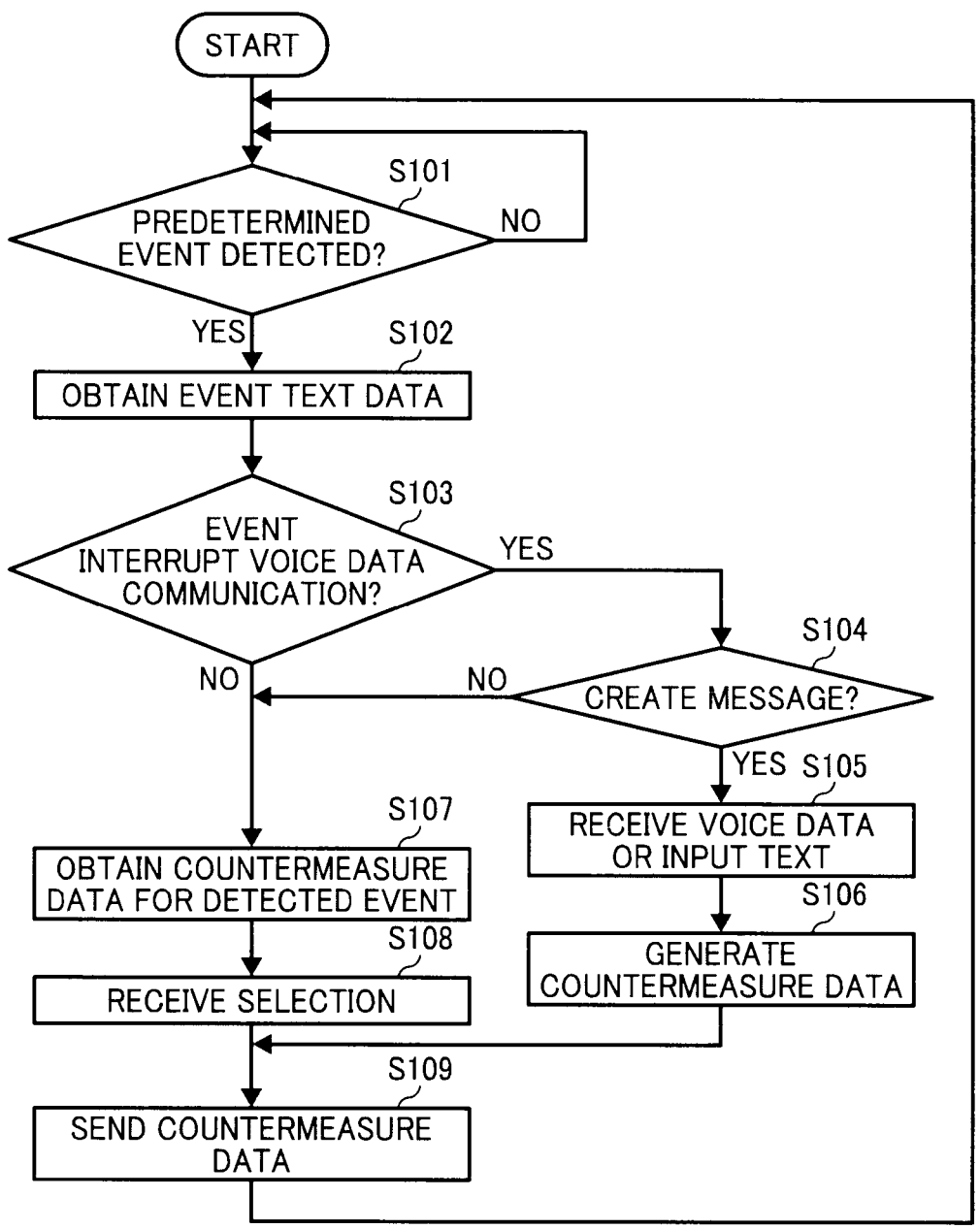
FIG. 27 is a flowchart illustrating operation of transmitting countermeasure data, performed by the transmission terminal of FIG. 1, according to an example embodiment of the present invention.
Figure 28:
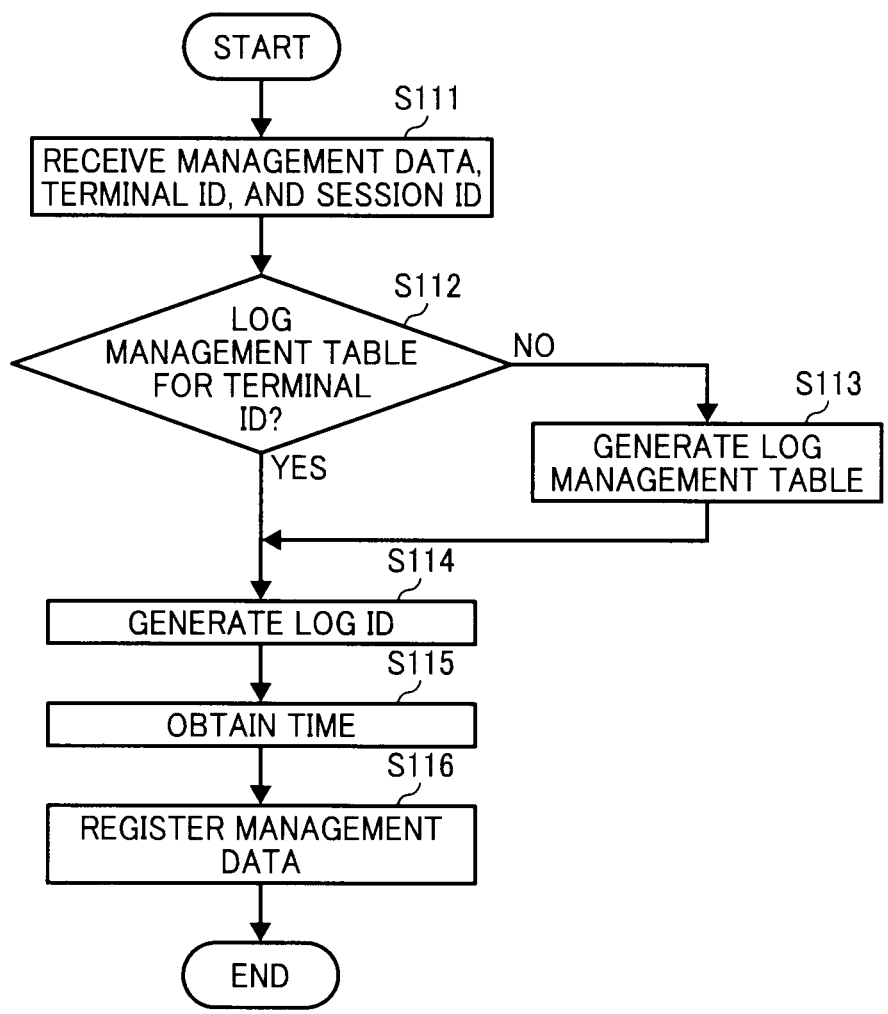
FIG. 28 is a flowchart illustrating operation of registering log data, performed by the log management apparatus of the transmission system of FIG. 1, according to an example embodiment of the present invention.

Referring now to FIGS. 17 to 28, operation performed by the transmission system 1 is explained according to an example embodiment of the present invention. FIG. 17 is a data sequence diagram illustrating operation of managing state information indicating the operation state of the relay terminal 30, which is sent from the relay terminal 30 to the management system 50, according to an example embodiment of the present invention. FIG. 18 is an illustration for explaining transmission or reception of various data including image data, voice data, and management data, performed by the transmission system of FIG. 1. FIG. 19 is a data sequence diagram illustrating operation of preparing for communication to be established between or among two or more of terminals 10. FIG. 20 is a data sequence diagram illustrating operation of selecting the relay terminal 30. FIG. 22 is a flowchart illustrating operation of selecting the relay terminal 30. FIG. 23 is a table for explaining operation of calculating a total priority point to be used for operation of selecting the relay terminal 30. FIG. 24 is a data sequence diagram illustrating operation of selecting the relay terminal 30. FIG. 25 is a flowchart illustrating operation of selecting the relay terminal 30, performed by the terminal 10. FIG. 26 is a data sequence diagram illustrating operation of transmitting or receiving contents data such as image data and/or voice data to or from one terminal to another terminal. FIG. 27 is a flowchart illustrating operation of transmitting countermeasure data when a predetermined event is detected. FIG. 28 is a flowchart illustrating operation of registering log data.

Referring now to FIG. 17, operation of managing state information of the terminal 30, which is sent from each terminal 30 to the transmission management apparatus 500, performed by the transmission system 1 is explained according to an example embodiment of the present invention. In this example, it is assumed that the relay terminals 30a, 30b, 30c, and 30d, which may be each or collectively referred to as the relay terminal 30, exists in the transmission system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 4) of the relay terminal 30.

At S2-1, S2-2, S2-3, and S2-4, the data transmit/receive 301 of the relay terminal 30 periodically transmits state information of the relay terminal 30 to the management apparatus 500 through the communication network 2. With the state information of the relay terminal 30 that is periodically received, the management apparatus 500 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management apparatus 500 receives the state information from the relay terminal 30 at the data transmit/receive 501, and stores the received state information of the relay terminal 30 in the memory 5000 through the memory control 509. More specifically, the memory control 509 stores the state information of each relay terminal 30 in association with the relay terminal ID of the corresponding relay terminal 30 in the relay terminal management DB 5001 (FIG. 8).

For example, referring to FIG. 8, the management apparatus 500 stores the state information of the relay terminal 30 indicating whether the relay terminal 30 is on-line, off-line, or in trouble, etc., in association with the relay terminal ID of the relay terminal 30. Additionally, the management apparatus 500 stores the date and time information indicating the time when the management apparatus 500 receives the state information of the relay terminal 30 in association with the relay terminal ID of the relay terminal 30. When the management apparatus 500 does not receive any state information from the relay terminal 30, the relay terminal management table of FIG. 8 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management apparatus 500 it the relay terminal management table of FIG. 8 retains such value.

Referring now to FIG. 18, transmission or reception of various data such as image data, voice data, and management data, performed by the transmission system 1, is explained. As illustrated in FIG. 18, in the transmission system 1, the request terminal 10A and the counterpart terminal 10B establish four contents data sessions sed to transmit or receive contents data through the relay terminal 30. The four contents data sessions, which may be referred to as image and/or voice data sessions, include a session "HL" to transmit high-level resolution image data HL, a session "ML" to transmit medium-level resolution image data ML, a session "LL" to transmit low-level resolution image data LL, and a session "V" to transmit voice data V.

Further, the request terminal 10A and the counterpart terminal 10B establish a management data session sei to start transmission and reception of various types of management data through the management apparatus 500 of the management system 50. After it is established, the management data session sei is kept connected at least for a time period between the time when the start management data is received from the request terminal 10A and the time when the end management data is received from the request terminal 10A or the counterpart terminal 10B.

Further, the contents data session sed is established using a communication protocol that is appropriate for communication of data such as image data and/or voice data, such as real-time data transport protocol (RTP). For its realtime characteristics, RTP communicates using user datagram protocol (UDP). Unlike transmission control protocol (TCP), UDP is not provided with a function of re-transmitting a packet, or a function of error detection. Accordingly, data that is communicated through the contents data session sed using UDP may not be safely communicated, for example, as it may be filtered by firewall. This may result in interruption of communication between or among the terminals 10.

The management data session sei through which management data or countermeasure data is communicated is established using a communication protocol that is more stable than the communication protocol of the contents data session sed. For example, extensible messaging and presence protocol (XMPP) may be preferably used. By extending the instant messenger function of XMPP, even when the request terminal 10A is not able to transmit voice data due to the error in microphone, for example, the request terminal 10A is able to transmit the countermeasure data to the counterpart terminal 10B in the form of text data. The text data, which is communicated using XMPP and received at the counterpart terminal 10B, may be converted to voice data for output to the user at the counterpart terminal 10B. In this manner, communication of pseudo-voice data is maintained even when the request terminal 10A is not able to transmit voice data.

Referring now to FIG. 19, operation of transmitting and receiving various management data before starting videoconference between the request terminal 10aa and the counterpart terminal 10db is explained, according to an example embodiment of the present invention. More specifically, the operation of FIG. 19 is performed during a management data session sei in which various management data is exchanged.

At S21, the user at the request terminal 10aa turns on the power of the request terminal 10aa through the power switch 109 (FIG. 2). The operation input 12 of the request terminal 10aa (FIG. 4) turns on the power of the request terminal 10aa.

At S22, as the power of the request terminal 10aa is turned on, the login request 13 of the request terminal 10aa automatically causes the communication unit 11 to send the login request information that requests the login process to the management apparatus 500 through the communication network 2. The login request information includes a terminal ID that identifies the request terminal 10aa, and a password assigned to the request terminal 10aa. The terminal ID and the password may be obtained by the memory control 19 from the memory 1000, and sent to the communication unit 11. At the time of sending the login request information from the request terminal 10aa to the management apparatus 500, the request terminal 10aa sends an IP address of the request terminal 10aa such that the management apparatus 500 knows the IP address of the request terminal 10aa.

At S23, the terminal authenticator 502 of the management apparatus 500 searches the terminal authentication management DB 5002 (FIG. 9) stored in the memory 5000 using the terminal ID and the password of the login request information received through the data transmit/receive 501. When it is determined that the terminal ID and the password of the login request information is stored in the terminal authentication management DB 5002, the terminal authenticator 502 determines that the terminal 10aa is authenticated.

At S24, when the terminal authenticator 502 authenticates that the login request information is received from the authenticated terminal 10, the state manager 503 of the management apparatus 500 stores the operation state, the date and time at which the login request information is received, and the IP address of the terminal 10aa, with respect to the terminal ID and the terminal name of the terminal 10aa in the terminal management DB 5003 (FIG. 10) to create a record of the terminal 10aa. Using the terminal management table of FIG. 10, which stores the operations state of online, the date and time of "13:40, Nov. 10, 2009", and the terminal IP address of "1.2.1.3" in association with the terminal ID "01aa", various information regarding the terminal 10aa can be managed.

At S25, the data transmit/receive 501 of the management apparatus 500 sends the authentication result obtained by the terminal authenticator 502 to the request terminal 10aa that has sent the login request information through the communication network 2. As described above, in this example, it is assumed that the terminal authenticator 502 determines that the terminal 10aa is an authenticated terminal.

At S26, the terminal extractor 504 of the management apparatus 500 searches the candidate list management table of FIG. 11 using the terminal ID "01aa" of the request terminal 10aa that has sent the login request information to extract a terminal ID of a candidate terminal 10 that is previously registered for the request terminal 10aa. For example, referring to FIG. 11, the terminal extractor 504 extracts terminal IDs including "01ab", "01ba", "01bb", and "01db" of the candidate terminals 10ab, 10ba, 10bb, and 10db for the request terminal 10aa having the terminal ID of "01aa".

At S27, the terminal state obtainer 505 searches the terminal management table of FIG. 10 using the terminal IDs of the candidate terminals 10 that are extracted by the terminal extractor 504, such as the terminal IDs "01ab", "01ba", "01bb", and "01db", as a search key to obtain names and operation states of the candidate terminals 10. Referring to FIG. 10, the terminal names including "Japan Tokyo Office AB Terminal", "Japan Osaka Office BA Terminal", "Japan Osaka Office BB Terminal", and "U.S. Washington, D.C. Office, DB Terminal", and the operation states including "OFFLINE", "ONLINE", "ONLINE", and "ONLINE" are obtained, respectively, for the candidate terminals 10ab, 10ba, 10bb, and 10db.

At S28, the data transmit/receive 501 sends the candidate list information including the terminal ID used as a search key at S27, the terminal name, and the operation state of each candidate terminal 10, to the request terminal 10aa through the communication network 2. With this candidate list information, the request terminal 10aa is able to know the current operation state of each of the candidate terminals 10ab, 10ba, 10bb, and 10db that are registered for the request terminal 10aa.

At S29, the terminal extractor 504 of the management apparatus 500 searches the candidate list management table of FIG. 11 using the terminal ID "01aa" of the request terminal 10aa that has sent the login request information as a search key to extract a terminal ID of a terminal 10 that registers the request terminal 10aa as a candidate terminal. Referring to FIG. 11, the terminal IDs including "01ab", "01ba", "01bb", and "01db" of the terminals 10ab, 10ba, 10bb, and 10db are extracted as the terminal 10 having the request terminal 10aa as a candidate terminal.

At S30, the terminal state obtainer 505 searches the terminal management table of FIG. 10, stored in the terminal management DB 5003, using the terminal ID "01aa" of the request terminal 10aa that has sent the login request information to obtain the operation state of the request terminal 10aa.

At S31-1, S31-2, and S31-3, the data transmit/receive 501 sends the terminal state information including the terminal ID "01aa" and the operation state "ONLINE" of the request terminal 10aa, which are obtained at S30, respectively, to the terminals 10ba, 10bb, and 10db. At this step, the data transmit/receive 501 sends the terminal state information to the terminal 10 having the operation state of "ONLINE". When transmitting the terminal state information to the terminals 10ba, 10bb, and 10db, the data transmit/receive 501 refers to the terminal management table of FIG. 10 to obtain an IP address of each of the terminals 10ba, 10bb, and 10db using the terminal ID "01ba", "01bb", and "01db". With the IP address, the data transmit/receive 501 is able to communicate with the terminals 10ba, 10bb, and 10db to notify the terminal ID "01aa" of the request terminal 10aa and the operation state of the request terminal 10aa.

The above-described operation of S22 to S31-1, S31-2, and S31-3 is performed by any desired terminal 10 as the power of the terminal 10 is turned on through the power switch 109 (FIG. 2).

Referring now to FIG. 20, operation of limiting a number of candidate relay terminals 30 is explained according to an example embodiment of the present invention. The operation of FIG. 20 is performed during a management data session sei (FIG. 18), which transmits or receives various management data in the transmission system 1.

When the terminal state information is received from the transmission management apparatus 500, the operation input 12 (FIG. 4) of the request terminal 10aa generates a candidate list based on the terminal state information such as the name and the operation state of each one of the candidate terminals 10 for display through the display 120. For example, the candidate list of FIG. 21 may be displayed through the display 120 of the request terminal 10aa. The candidate list of FIG. 21 includes a candidate list frame 11-1, which displays therein the names of the candidate terminals 10ab, 10ba, 10bb, and 10db, and icons 11-3d, 11-3c, 11-3b, and 11-3a respectively indicating the operations states of the candidate terminals 10ab, 10ba, 10bb, and 10db. The icon 11-3a indicates that the candidate terminal 10db with the terminal name "U.S. Washington, D.C. Office, DB Terminal" is online state, but communicating with another terminal. The icon 11-3b indicates that the candidate terminal 10ba with the terminal name "Japan Osaka Office BB Terminal" is communicating with another terminal while allowing another terminal to participate in videoconference. The icon 11-3c indicates that the candidate terminal 10ba with the terminal name "Japan Osaka Office BA Terminal" is communicating with another terminal, but currently not available. The icon 11-3d indicates that the candidate terminal 10ab with the terminal name "Japan Tokyo Office AB Terminal" is in the off-line state.

In this example, the request terminal 10aa is able to start videoconference with at least one of the terminals 10bb and 10db each having the on-line state and is available. For the descriptive purposes, it is assumed that the user at the request terminal 10aa starts videoconference with the terminal 10db.

At S41, the user at the request terminal 10aa operates the operation button 108 to select the terminal 10db as a counter-part terminal. Upon selection, the operation input 12 (FIG. 4) of the request terminal 10aa receives a user instruction for starting communication with the counterpart terminal 10db.

At S42, the communication unit 11 of the request terminal 10aa sends the communication start request information that requests the management apparatus 500 to start communication with the counterpart terminal 10db to the management apparatus 500. The communication start request information at least includes identification information such as the terminal ID "01aa" of the request terminal 10aa and the terminal ID "01db" of the counterpart terminal 10db, with a message requesting to start videoconference.

At the time of receiving the communication start request information, the data transmit/receive 501 of the management apparatus 500 obtains the IP address "1.2.1.3" of the request terminal 10aa.

At S43, the state manager 503 looks for records in the terminal management table of FIG. 10 stored in the terminal management DB 5003 based on the terminal ID "01aa" of the request terminal 10aa and the terminal ID "01db" of the counterpart terminal 10db, which are included in the communication start request information. The state manager 503 changes each of the operation states of the request terminal 10aa and the counterpart terminal 10db in the records, from the online state to the communicating state.

At this time, the request terminal 10aa and the counterpart terminal 10db has not started communication, but the request terminal 10aa and the counterpart terminal 10db each have the communicating state. In case another terminal 10 tries to communicate with the request terminal 10aa or the counterpart terminal 10db, the management apparatus 500 causes the another terminal 10 to output voice or display indicating that the request terminal 10aa or the counterpart terminal 10db is in the communicating state.

Next, operation of selecting the relay terminal 30 for communication, performed at S44 to S48, and S61-1 to S66 (FIGS. 24A and 24B), is explained according to an example embodiment of the present invention.

At S44, the management apparatus 500 prepares for a session that is performed for selecting the relay terminal 30 for communication between the request terminal 10aa and the counterpart terminal 10db. More specifically, at S44, the session ID generator 506a (FIG. 4) of the management apparatus 500 generates a session ID for a session that is to be performed for selection of the relay terminal 30 that relays data between the request terminal 10aa and the counterpart terminal 10db.

At S45, the session manager 507 stores the session ID "se1" generated at S44, the terminal ID "01aa" of the request terminal 10aa, and the terminal ID "01db" of the counterpart terminal 10db, in the session management DB 5005 (FIG. 12) stored in the memory 5000.

At S46, the primary relay terminal selection unit 506 of the management apparatus 500 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 22, operation performed at S46 of FIG. 20 is explained in detail.

At S46-1, the terminal IP address extractor 506b of the management apparatus 500 searches the terminal management DB 5003 (FIG. 10) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 506c refers to the relay terminal management DB 5001 (FIG. 8) to select one or more relay terminals 30 having the on-line operation state, and obtains the relay terminal ID of the selected relay terminal 30. More specifically, in this example, the primary selector 506c obtains the relay terminal IDs 111a, 111b, and 111d of the relay terminals 30a, 30b, and 30d.

At S46-3, the primary selector 506c searches the relay terminal management DB 5001 (FIG. 8) to obtain the IP address of each of the relay terminals 30a, 30b, and 30d, using the relay terminal IDs 111a, 111b, and 111d obtained at S46-2. Further, the primary selector 506c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 506d refers to the priority management DB 5006 (FIG. 13) to determine a value of address priority point for each one of the relay terminals 30a, 30b, and 30d. In this example, as illustrated in FIG. 23, for each one of the relay terminals 30a, 30b, and 30d, the priority determiner 506d obtains an address priority point with respect to the request terminal 10aa and an address priority point with respect to the counterpart terminal 10db.

FIG. 23 illustrates a table storing a calculation result of a priority point, which is used for limiting a number of candidate relay terminals 30. The table of FIG. 23 stores an address priority point, a transmission speed priority point, and a total priority point, for each one of the relay terminals IDs of the relay terminals 30. The address priority point includes a first address priority point with respect to the request terminal 10aa, and a second address priority point with respect to the counterpart terminal 10db. The total priority point is obtained by adding the highest one of the first and second address priority points with the transmission speed priority point.

In this example, based on comparison between the IP address "1.2.1.2" of the relay terminal 30a and the IP address "1.2.1.3" of the request terminal 10aa, the degree of similarity is "S.S.S.D" such that the address priority point of 5 is obtained. Similarly, based on comparison between the IP address "1.2.1.2" of the relay terminal 30a and the IP address "1.3.2.4" of the counterpart terminal 10db, the degree of similarity is "S.D.D.D" such that the address priority point of 1 is obtained.

Based on comparison between the IP address "1.2.2.2" of the relay terminal 30b and the IP address "1.2.1.3" of the request terminal 10aa, the degree of similarity is "S.S.D.D" such that the address priority point of 3 is obtained. Similarly, based on comparison between the IP address "1.2.2.2" of the relay terminal 30b and the IP address "1.3.2.4" of the counterpart terminal 10db, the degree of similarity is "S.D.S.D" such that the address priority point of 1 is obtained.

Based on comparison between the IP address "1.3.2.2" of the relay terminal 30d and the IP address "1.2.1.3" of the request terminal 10aa, the degree of similarity is "S.D.D.D" such that the address priority point of 1 is obtained. Similarly, based on comparison between the IP address "1.3.2.2" of the relay terminal 30a and the IP address "1.3.2.4" of the counterpart terminal 10db, the degree of similarity is "S.S.S.D" such that the address priority point of 5 is obtained.

Referring back to FIG. 22, at S46-5, the priority determiner 506d searches the priority management table of FIG. 14 of the priority management DB 5006 using the maximum data transmission speed of the relay terminal 30 that is stored in the relay terminal management table of FIG. 8 of the relay terminal management DB 5001 to determine a transmission priority point for each one of the relay terminals 30*a*, 30*b*, and 30*d* that are selected at S46-2.

In this example, referring to FIG. 8 and FIG. 14, the relay terminal 30*a* having the maximum data transmission speed of 100 Mbps is assigned with the transmission priority point of 3. Similarly, the relay terminal 30*b* having the maximum data transmission speed of 1000 Mbps is assigned with the transmission priority point of 5. Similarly, the relay terminal 30*d* having the maximum data transmission speed of 10 Mbps is assigned with the transmission priority point of 1. Accordingly, the priority determiner 506*d* stores the transmission priority point for each one of the relay terminals 30*a*, 30*b*, and 30*d* in the table of FIG. 23.

At S46-6, for each one of the relay terminals 30*a*, 30*b*, and 30*d*, the primary selector 506*c* adds the highest one of the first and second address priority points with the transmission speed priority point to obtain a total priority point. The primary selector 506*c* selects the total of two relay terminals 30 having the highest priority point. For example, the primary selector 506*c* selects the relay terminal 30 having the highest total priority point and the relay terminal 30 having the second highest total priority point as a candidate relay terminal 30 for further processing. In this example, referring to FIG. 23, the relay terminals 30*a*, 30*b*, and 30*d* having the relay terminal IDs 111*a*, 111*b*, and 111*d* respectively have the total priority points of 8, 8, and 6. Accordingly, the primary selector 506*c* selects the relay terminal 30*a* having the relay terminal ID 111*a*, and the relay terminal 30*b* having the relay terminal ID 111*b*.

After the operation of S46 illustrated in FIG. 20 completes, at S47 of FIG. 20, the data transmit/receive 501 (FIG. 4) of the transmission management apparatus 500 sends the relay terminal selection information to the counterpart terminal 10*db* through the communication network 2. The relay terminal selection information includes a number of candidate relay terminals 30, which is "2", the terminal ID "01*aa*" of the request terminal 10*aa*, and the session ID "se1" for relay terminal selection. With this relay terminal selection information, the counterpart terminal 10*db* is able to obtain information including the number of candidate relay terminals 30, the request terminal 10*aa* that requests for videoconference, and the session ID "se1" of the session for relay terminal selection. In addition, the counterpart terminal 10*db* obtains the IP address "1.1.1.2" of the transmission management apparatus 500 that has sent the relay terminal selection information.

At S48, the communication unit 11 of the counterpart terminal 10*db* sends confirmation information indicating that the relay terminal selection information is received, to the transmission management apparatus 500 through the communication network 2, with the IP address of the counterpart terminal 10*db*. The confirmation information includes the session ID "se1". With this confirmation information, the transmission management apparatus 500 is able to know that the counterpart terminal 10*db* is notified with the number of candidate relay terminals 30 obtained during the session se1, and the IP address "1.3.2.4" of the counterpart terminal 10*db*.

Referring now to FIGS. 24A, 24B, and 25, operation of selecting the relay terminal 30, performed by the counterpart terminal 10*db*, is explained according to an example embodiment of the present invention. The operation of FIGS. 24A, 24B, and 25 is performed during the management data session sei of FIG. 18, which transmits or receives various management data in the transmission system 1.

Before starting videoconference, at S61-1 and S61-2, the transmission management apparatus 500 sends preparatory relay request information, respectively, to the relay terminals 30*a* and 30*b*, which are selected by the transmission management apparatus 500 at S46 as candidate relay terminals. The preparatory relay request information requests the relay terminal 30 to perform relay processing before starting the videoconference. More specifically, the preparatory relay request information includes the session ID "se1", the IP address "1.2.1.3" of the request terminal 10*aa*, and the IP address "1.3.2.4" of the counterpart terminal 10*db*, and is transmitted with the IP address of the transmission management apparatus 500. With this preparatory relay request information, the relay terminals 30*a* and 30*b* are each able to obtain information including the session, the request terminal, the counterpart terminal, and the IP address "1.1.1.2" of the transmission management apparatus 500 that has sent the preparatory relay request information.

At S62-1 and S62-2, the relay terminals 30*a* and 30*b* each cause the data transmit/receive 31 to send preparatory transmit request information to the request terminal 10*aa* through the communication network 2. The preparatory transmit request information requests the request terminal 10*aa* to send preparatory transmit information including the Packet Internet Grouper (PING) to each one of the relay terminals 30*a* and 30*b* before starting the videoconference. More specifically, the preparatory transmit request information includes the session ID "se1", and is transmitted with the IP addresses of the relay terminals 30*a* and 30*b*. With this preparatory transmit request information, the request terminal 10*aa* is able to know that the preparatory transmit information is to be sent during the session with the session ID "se1", as well as the IP addresses "1.2.1.2" and "1.2.2.2" of the relay terminals 30*a* and 30*b*.

As described above, the transmission management apparatus 500 does not directly send the IP address of the counterpart terminal 10*db* to the request terminal 10*aa*. Instead, as described above referring to S61-1 and S61-2, the transmission management apparatus 500 sends the IP address of the counterpart terminal 10*db* respectively to the relay terminal 30*a* and the relay terminal 30*b*. As described above referring to S62-1, the relay terminal 30*aa* requests the request terminal 10*aa* to send the preparatory transmit information to the relay terminal 30*aa*. In this manner, the transmission management apparatus 500 prevents the terminal 10 from obtaining the IP address of another terminal 10, thus improving the security.

At S63-1 and S63-2, the request terminal 10*aa* causes the communication unit 11 to send the preparatory transmit information, respectively, to the relay terminals 30*a* and 30*b* through the communication network 2. The preparatory transmit information is sent to the counterpart terminal 10*db* through each one of the relay terminals 30*a* and 30*b* before the contents data such as the image data and the voice data is transmitted. By sending the preparatory transmit information in replace of the contents data, the transmission management apparatus 500 is able to calculate a time period required for transmitting the contents data from the request terminal 10*aa* to the counterpart terminal 10*db* through each one of the relay terminals 30*a* and 30*b*. Further, the preparatory transmit information includes PING information used for checking whether the request terminal 10*aa*, the relay terminal 30*a* or 30*b*, and the counterpart terminal 10*db* are each connected to allow communication, the date and time of which the request terminal 10*aa* sends the preparatory transmit information, and the session ID "se1". With this preparatory transmit information, each of the relay terminals 30*a* and 30*b* knows that the preparatory transmit information is transmitted in the session with the session ID "se1", and the IP address "1.2.1.3" of the request terminal 10aa that has sent the preparatory transmit information.

At S64-1 and S64-2, the relay terminals 30a and 30b each transmit the preparatory transmit information to the counterpart terminal 10db having the IP address "1.3.2.4", which is obtained from the preparatory transmit information. With the preparatory transmit information, the counterpart terminal 10db is able to know that the preparatory transmit information is transmitted during the session with the session ID "se1", and the IP addresses "1.2.1.2" and "1.2.2.2" of the relay terminals 30a and 30b that respectively send the preparatory transmit information.

Referring to FIG. 24B, at S65, the secondary relay terminal selection unit 16 of the counterpart terminal 10db selects one of the relay terminals 30a and 30b to be used for videoconference, based on the preparatory transmit information.

Referring now to FIG. 4 and FIG. 25, operation of selecting the relay terminal 30 for videoconference, which is performed at S65 of FIG. 24B, is explained.

At S65-1, the counter 16a of the secondary relay terminal selection unit 16 (FIG. 4) obtains the date and time at which the communication unit 11 of the counterpart terminal 10db receives the preparatory transmit information for each one of the relay terminals 30a and 30b.

At S65-2, the calculator 16b calculates, for each one of the relay terminals 30a and 30b, a time period between the time when the preparatory transmit information is transmitted by the request terminal 10aa and the time when the preparatory transmit information is received by the counterpart terminal 10db. The date and time at which the preparatory information is transmitted by the request terminal 10aa is obtainable from the preparatory transmit information. The date and time of which the preparatory transmit information is received at the counterpart terminal 10db is obtained by the counter 16a.

At S65-3, the secondary selector 16c determines whether all items of preparatory transmit information is received for all of candidate relay terminals, during the session with the session ID "se1". In this example, the secondary selector 16c counts a total number of items of preparatory transmit information that have been received, and compares with the total number of candidate relay terminals 30 of "2".

When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5.

At S65-4, the secondary selector 16c determines whether a predetermined time period passes after the preparatory transmit information is received at the counterpart terminal 10db. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5.

At S65-5, the secondary selector 16c selects one of the relay terminals 30, which has the least value of the time period required for transmitting the preparatory transmit information based on the calculation of the calculator 16b.

In this example, it is assumed that the relay terminal 30a is selected as a time period for transmitting the preparatory transmit information that is relayed through the relay terminal 30a has a value less than the value of the time period for transmitting the preparatory transmit information that is relayed through the relay terminal 30b.

Referring back to FIG. 24B, at S66, the communication unit 11 of the counterpart terminal 10db sends the relay terminal selection information to the transmission management apparatus 500 through the communication network 2. In this example, the relay terminal selection information indicates that the relay terminal 30a is selected. More specifically, the relay terminal selection information includes the session ID "se1", and the relay terminal ID "111a" of the selected relay terminal 30a, and is transmitted with the terminal IP address of the counterpart terminal 10db. With the relay terminal selection information, the transmission management apparatus 500 is able to know that the relay terminal 30a has been selected during the session with the session ID "se1", and the IP address "1.3.2.4" of the counterpart terminal 10db that has sent the relay terminal selection information.

At S67, the session manager 507 of the transmission management apparatus 500 stores, in the session management table of FIG. 12 stored in the session management DB 5005, the relay terminal ID "111a" of the relay terminal 30a, which is finally selected for communication, in the "relay terminal ID" field of a record provided for the session with the session ID "se1".

At S68, the data transmit/receive 501 of the transmission management apparatus 500 sends the relay start request information to the relay terminal 30a through the communication network 2. The relay start request information requests the relay terminal 30a to start relay operation. More specifically, the relay start request information includes the IP address "1.2.1.3" of the request terminal 10aa, and the IP address "1.3.2.4" of the counterpart terminal 10db.

At S69, the relay terminal 30a establishes four sessions between the request terminal 10aa and the counterpart terminal 10db including a session for transmission of low-level resolution image data, a session for transmission of medium-level resolution image data, a session for transmission of high-level resolution image data, and a session for transmission of voice data. Once these sessions are established, the request terminal 10aa is able to start videoconference with the counterpart terminal 10db.

In the above-described example, the transmission management apparatus 500 sends the relay terminal selection information to the counterpart terminal 10db at S47 (FIG. 20), and the counterpart terminal 10db performs operation of S48, S64-1 (FIG. 24A), S64-2 (FIG. 24B), and S65 (FIG. 24B) to select the relay terminal 30. In alternative to this example, the transmission management apparatus 500 may send the relay terminal selection information to the request terminal 10aa to cause the request terminal 10aa to perform selection of the relay terminal 30. In such case, the request terminal 10aa performs operation of S48, S64-1 (FIG. 24A), S64-2 (FIG. 24B), and S65 (FIG. 24B) in a substantially similar manner as described above. Further, at S66, the request terminal 10aa sends the relay terminal selection information to the transmission management apparatus 500.

Alternatively, the counterpart terminal 10db may send information indicating a time period counted from the time when the preparatory transmit information is transmitted and the time when the preparatory transmit information is received to any one of the request terminal 10aa or the management apparatus 500. Based on this information, the request terminal 10aa or the transmission management apparatus 500 may select one relay terminal 30a.

Referring now to FIG. 4 and FIG. 26, operation of transmitting and receiving contents data such as image data and voice data between the request terminal and the counterpart terminal to carry out videoconference, performed by the transmission system 1, is explained according to an example embodiment of the present invention.

In this example, the contents data such as the image data and the voice data flows in a direction from the request terminal 10*aa* to the counterpart terminal 10*db*, or in another direction from the counterpart terminal 10*db* to the request terminal 10*aa*. Since operation such as transmission and reception of the contents data or detection of delay time is the same for both of the directions, the following example focuses on communication in which data flows from the request terminal 10*aa* to the counterpart terminal 10*db*.

Referring to FIG. 26, at S81, the communication unit 11 of the request terminal 10*aa* sends the contents data to the relay terminal 30*a* through the communication network 2 in the contents data session "sed". The contents data includes image data such as image data of an object captured by the imaging unit 14*a* and voice data that is input through the voice input 15*a*. In this example, it is assumed that the high-quality image data based on the low-level resolution image data, the medium-level resolution image data, and the high-level resolution image data, and the voice data, are transmitted. Accordingly, the data transmit/receive 31 of the relay terminal 30*a* receives the image data of three different resolution levels, and the voice data.

At S82, the data quality checker 33 searches the data quality management DB 3001 (FIG. 6) using the IP address "1.3.2.4" of the counterpart terminal 10*db* as a key to obtain the quality of the image data to be transmitted to the relay terminal 30*a*.

In this example, the quality of image data to be transmitted to the relay terminal 30*a* is the high-quality image data. Since the image data that is received at the data transmit/receive 31 has the quality that is the same as the quality of the image data obtained from the data quality management DB 3001, at S83, the relay terminal 30*a* sends the high-quality image data and the voice data to the counterpart terminal 10*db* in the contents data session "sed", without applying further image processing.

The counterpart terminal 10*db* receives the high quality image data that is generated based on the low-level resolution image data, medium-level resolution image data, and high-level resolution image data, and the voice data, at the communication unit 11. The display control 14*b* combines the image data of three different resolution levels into the high quality image data for display onto the display 120. Further, the voice output 15*b* outputs the voice sound based on the voice data.

At S84, the delay detector 17 of the counterpart terminal 10*db* periodically detects a delay time indicating the time at which the image data is received at the communication unit 11, for example, every one second. In this example, it is assumed that the delay time of 200 ms is obtained.

At S85, the communication unit 11 of the counterpart terminal 10*db* sends the delay time information indicating the delay time of 200 ms to the transmission management apparatus 500 through the communication network 2, during the management data session "sei". With the delay time information, the transmission management apparatus 500 is notified of the delay time, and the IP address "1.3.2.4" of the counterpart terminal 10*db* that has sent the delay time information.

At S86, the delay time manager 510 of the transmission management apparatus 500 searches the terminal management DB 5003 (FIG. 10) using the IP address "1.3.2.4" of the counterpart terminal 10*db* as a search key to extract the terminal ID "01*db*" of the counterpart terminal 10*db*. The delay time manager 510 stores the delay time of 200 ms obtained from the delay time information in a "delay time" field of the record of the terminal ID "01*db*" of the session management table stored in the session management DB 5005 (FIG. 12).

At S87, the quality determiner 508 searches the quality management DB 5007 (FIG. 15) using the delay time of 200 ms to extract the image data quality of "MEDIUM". Based on the extracted image data quality, the quality determiner 508 determines that the quality of image data suitable for the delay time of 200 ms is medium.

At S88, the data transmit/receive 501 searches the relay terminal management DB 5001 (FIG. 8) using the relay terminal ID "111*a*", which is stored in the session management DB (FIG. 12) in association with the counterpart terminal ID "01*db*", to extract the IP address "1.2.1.2" of the relay terminal 30*a*.

At S89, the data transmit/receive 501 sends the quality information indicating that the image data quality that has been determined at S87 is medium-level, to the relay terminal 30*a* through the communication network 2 during the management data session "sei". The image quality information is transmitted with the IP address "1.3.2.4" of the counterpart terminal 10*db*, which was used as a search key at S86.

At S90, the change quality manager 34 of the relay terminal 30*a* stores the IP address "1.3.2.4" of the counterpart terminal 10*db* in association with the "medium-level" quality image data to be relayed by the counterpart terminal 10*db*, in the data quality management DB 3001 (FIG. 6).

At S91, the request terminal 10*aa* transmits the high quality image data including the low-level resolution image data, the medium-level resolution image data, and the high-level resolution image data, and the voice data, to the relay terminal 30*a* during the contents data session "sed", in a substantially similar manner as described above referring to S81.

At S92, the data quality checker 33 of the relay terminal 30*a* searches the data quality management DB 3001 (FIG. 6) using the IP address "1.3.2.4" of the counterpart terminal 10*db* as a search key to extract the quality of the image data suitable for the counterpart terminal 10*db*, in a substantially similar manner as described above referring to S82.

At S93, since the image data quality that is stored for the counterpart terminal 10*db* is the medium-level, which is lower than the quality of the image data that is received at the data transmit/receive 31, the data quality changer 35 changes the quality of the image data from the high-level to the medium level. In this example, the quality of the voice data remains the same.

At S94, the data transmit/receive 31 of the relay terminal 30 sends the image data having the quality that is lowered to the medium-level, and the voice data, to the counterpart terminal 10*db* through the communication network 2, during the contents data session "sed". The communication unit 11 of the counterpart terminal 10*db* receives the medium-quality image data that is generated based on the low-level resolution image data and the medium-level resolution image data, and the voice data. The display control 16 of the counterpart terminal 10*db* combines the image data of two different resolution levels to generate the medium-level image data for display on the display 120. Further, the voice output 15*db* outputs the voice sound generated based on the voice data.

As described above, when any delay in receiving the image data at the counterpart terminal 10*db* is observed, the relay terminal 30*a* changes the quality of image data by lowering the quality of image data. Accordingly, the users participating the videoconference are able to carry out communication more smoothly.

Referring now to FIG. 27, operation of detecting a predetermined event, and sending countermeasure data generated based on the detected event to the transmission management apparatus 500, performed by the terminal 10aa, is explained according to an example embodiment of the present invention. The operation of FIG. 27 is performed by the terminal 10aa at a predetermined time after the power switch 109 is turned on. The predetermined time may be any time after the authentication result is received at S25 of FIG. 19, or any time after the contents data session sed with the terminal 10db is established at S69 of FIG. 24B.

The predetermined event is any event that may prevent or interrupt communication with a user at another transmission terminal. In this example, the predetermined event is specified by the event data managed by the countermeasure data management table of FIG. 5A or 5B. More specifically, examples of the predetermined event include, but not limited to, errors in hardware resources of the terminal 10, errors or maintenance needs in software resources such as operating system or firmware of the terminal 10, and errors in network connection between the terminal 10 and the relay terminal 30.

At S101, the event detector 18 of the terminal 10aa determines whether a predetermined event that is previously specified by the event data stored in the countermeasure data management table of FIG. 5A is detected. At S101, when it is determined that the predetermined event is not detected ("NO" at S101), the operation repeats S101. When it is determined that the predetermined event is detected ("YES" at S101), the operation proceeds to S102.

At S102, the countermeasure data generator 20 refers to the countermeasure data management table of FIG. 5A to obtain event text data that is stored with respect to the event data of the detected event. The display control 14b may cause the display 120 to display a message based on the event text data obtained by the countermeasure data generator 20.

At S103, the countermeasure data generator 20 determines whether the detected event is a predetermined event that may prevent or interrupt communication of voice data. More specifically, the countermeasure data generator 20 refers to the countermeasure data management table of FIG. 5A stored in the countermeasure data management DB 1001 to obtain the voice data communication data that is stored with respect to the detected event, and determines whether voice data can be communicated based on the voice data communication data.

When it is determined that the detected event is the predetermined event that may prevent or interrupt communication of voice data, that is, the voice data communication data is "FALSE" ("YES" at S103), the operation proceeds to S104. In this example illustrated in FIG. 5A, the event indicating a microphone error and the event indicating a speaker error each have the voice data communication data "FALSE".

At S104, the display control 14b causes the display 120 to display a message, which asks a user at the terminal 10aa whether to create a message to be transmitted to another terminal 10db. When the operation input 12 receives a user instruction for creating a message at S104, the operation proceeds to S105. For example, the display 120 may display a message: "Do you want to create your own message?" preferably with a message indicating that there is the microphone error or the speaker error. Assuming that the operation input 12 receives a user instruction for creating the message, the operation input 12 further receives voice data generated based on the user's voice input through the microphone 114 or text data input by the operation button 108. More specifically, when the event detected by the event detector 18 is an error in speaker at the request terminal 10aa, the request terminal 10aa requests the user to speak at the microphone 114. Alternatively, when the event detected by the event detector 18 is an error in microphone at the request terminal 10aa, the display control 14b requests the user at the terminal 10aa to input text data using the operation button 108.

At S105, the converter 21 converts the voice data that is generated based on the voice input through the microphone 114 to text data.

At S106, the countermeasure data generator 20 generates countermeasure data, based on the text data that is converted from the voice data or the text data input through the operation button 108. In this example, it is assumed that the countermeasure data generated based on the user's voice or user's input relates to an action that the user at the request terminal 10aa will take or an action that the user at the request terminal 10aa requests the user at the counterpart terminal 10db to take.

When it is determined that the detected event is not the predetermined event that may prevent or interrupt communication of voice data at S103, that is, the voice data communication data is "TRUE", or when the operation input 12 receives a user input for not creating a message at S104, at S107, the countermeasure data generator 20 refers to the countermeasure management table of FIG. 5A to obtain the countermeasure data that is stored with respect to the detected event. The display control 14b causes the display 120 to display a message based on the countermeasure data that is obtained.

For example, assuming that the event indicating the microphone error is detected, that is, when the voice data communication data is "FALSE", the display 120 displays a message 311 illustrated in FIG. 30 based on the event text data and the countermeasure data obtained from the countermeasure management table of FIG. 5A. In another example, when the event indicating the speaker error is detected, the display 120 displays a message that is similar to the message 311 of FIG. 30 except that the message indicates that the speaker error is detected.

In another example, assuming that the event indicating the camera error is detected, that is, when the voice data communication data is "TRUE", the display 120 displays a message 312 illustrated in FIG. 30 based on the event text data and the countermeasure data obtained from the countermeasure management table of FIG. 5A. In addition to the message 312, the display 120 may further display a message: "Replacing with a new machine. We will reconnect in 5 minutes", as shown in the message 311 of FIG. 30, based on the countermeasure data obtained from the countermeasure management table.

At S108, the operation input 12 allows the user to select at least one of the options being displayed through the display 120, for example, using the operation button 108. For example, referring to FIG. 30, when the message 311 is displayed, the user at the request terminal 10aa may select either one of the upper key and the lower key of the operation button 108 to select a message to be sent to the counterpart terminal 10db. In another example, referring to FIG. 30, when the message 312 is displayed, the user at the request terminal 10aa may select the right key of the operation button 108 to continue communication with the user at the counterpart terminal 10db without image data.

At S109, the management data communication unit 11b of the communication unit 11 sends the countermeasure data that is generated at S106 or selected at S108, the event data indicating an event that is detected, and a session ID of the current session for communication between the request terminal 10aa and the counterpart terminal 10db, to the transmission management apparatus 500 through the management data session sei.

In this example, information including the countermeasure data is transmitted via a communication protocol to be used for the management data session sei, such as XMPP. The data transmit/receive 501 of the transmission management apparatus 500 sends the countermeasure data and the event data to the terminal 10*db* through the management data session sei. In this manner, the terminal 10*aa* transmits the countermeasure data and the event data to the terminal 10*db* through the transmission management apparatus 500.

When S109 is completed, the operation returns to S101 to monitor a predetermined event.

The terminal 10*db* that receives the event data and the countermeasure data from the management apparatus 500 causes the display 120 of the terminal 10*db* to display data based on the received event data and the countermeasure data. The terminal 10*db* further generates or selects countermeasure data to be transmitted to the terminal 10*aa*, and transmits the countermeasure data to the terminal 10*aa*. In such case, the terminal 10*db* performs operation in a substantially similar manner as described above referring to S102 to S109 of FIG. 27, except that the countermeasure data management table of FIG. 5B is used instead of the countermeasure data management table of FIG. 5A.

For example, assuming that the request terminal 10*aa* receives a user instruction for selecting the upper key of the operation button 108 when the message 311 of FIG. 30 is displayed, the request terminal 10*aa* sends the event data, and the countermeasure data that is selected to the transmission management apparatus 500 through the management data session. When the counterpart terminal 10*db* receives the event data and the selected countermeasure data of the request terminal 10*aa*, the countermeasure data generator 20 of the counterpart terminal 10*db* refers to the countermeasure management table of FIG. 5B to obtain the event text data that corresponds to the received event data, and the countermeasure data that corresponds to the received event data. The display control 14*b* causes the display 120 to display a message based on the event text data, a message generated based on the received countermeasure data of the request terminal 10*aa*, and a message generated based on the countermeasure data of the counterpart terminal 10*db*. For example, the display 120 may display a message: "Microphone Error detected at a counterpart terminal" based on the event text data, a message: "Replacing with a new machine. We will reconnect in 5 minutes" based on the received countermeasure data, and a message: "Please select key to send a message. Upper Key: O.K. We will wait for 5 minutes. Lower Key: Please call." Based on the countermeasure data of the counterpart terminal 10*db*. With this message, the user at the counterpart terminal 10*db* is able to know that the error is detected at the request terminal 10*aa* and the action that the user at the request terminal 10*aa* will take. Further, the user at the counterpart terminal 10*db* is able to select one of the options as an action to be taken. In this example, the countermeasure data generator 20 of the counterpart terminal 10*db* selects the countermeasure data based on the user instruction, and causes the management data communication unit 11*b* to transmit the selected countermeasure data to the management apparatus 500 through the second session.

Alternatively, the counterpart terminal 10*db* may request the user to input voice data or text data as a message to be transmitted to the request terminal 10*aa*. In such case, the countermeasure data generator 20 of the counterpart terminal 10*db* generates countermeasure data based on the voice data or text data input by the user.

In this manner, even when the speaker or microphone of the terminal 10*aa* is in trouble, the terminals 10*aa* and 10*db* are able to exchange data such as countermeasure data to continue communication with each other without interruption.

The countermeasure data may be generated based on text data converted from voice data or input by the user, or selected from the countermeasure data management table.

Referring to FIGS. 20 and 28, operation of generating log data based on management data, event data, or countermeasure data, that is received from the terminal 10*aa*, and registering the log data, performed by the log management apparatus 550, is explained according to an example embodiment of the present invention. For the descriptive purposes, in this example, it is assumed that the log management apparatus 550 registers log data indicating the communication state, when the contents data session sed is established between the terminal 10*aa* and the terminal 10*db*.

When the data transmit/receive 501 of the transmission management apparatus 500 receives the session start request from the terminal 10*aa* at S42 of FIG. 20, the data transmit/receive 501 extracts the session start management data "invite", the terminal ID "01*aa*" of the request terminal 10*aa*, respectively from the session start request.

At S44 of FIG. 20, when the session ID generator 506*a* of the transmission management apparatus 500 generates the session ID, the data transmit/receive 501 of the transmission management apparatus 500 transmits the session start management data, the terminal ID of the request terminal 10*aa*, and the generated session ID, to the log management apparatus 550.

At S111 of FIG. 28, the data transmit/receive 551 of the log management apparatus 550 receives the session start management data, the generated terminal ID, and the session ID, from the transmission management apparatus 500.

At S112, the log generator 552 of the log management apparatus 550 refers to the memory control 509 to determine whether a log management table (FIG. 16) that corresponds to the terminal ID received from the log management apparatus 550 is stored in the log management DB 5501.

At S113, when there is no log management table that corresponds to the received terminal ID ("NO" at S113), the log generator 552 causes the memory control 509 to generate a log management table that corresponds to the received terminal ID.

At S114, the log generator 552 of the log management apparatus 550 generates a log ID for identifying data to be registered.

At S115, the log generator 552 obtains information regarding a current time from a timer managed by the log management apparatus 550. In this example, a timer provided in the log management apparatus 550 is used to obtain the current time information.

At S116, the log generator 552 causes the memory control 509 to register the log ID, the current time information ("TIME DATA"), the received start management data, and the received session ID, to the log management table (FIG. 16) that corresponds to the terminal ID "01*aa*" of the request terminal 10*aa*.

In the above-described example, the log generator 552 registers various data at the time when the contents data session sed is started. When the contents data session sed ends, the log generator 552 registers the log ID, the current time information, the session end management data "bye", and the session ID to the log management table that corresponds to the received terminal ID, in a substantially similar manner as described above.

Based on the difference between the time information indicating the start of the session and the time information indicating the end of the session for the same session ID stored in the log management table of FIG. 16, a communication time for the session can be calculated. Based on this calculation result, the log management apparatus 550 is able to manage a communication time for each session. As described above, since the time information is obtained by the timer managed by the log management apparatus 550, the communication time calculated based on the time information is accurate.

In case when the transmission management apparatus 500 receives countermeasure data, the log generator 552 registers the log ID, the time information, the event data such as event data indicating an error in connection with the relay terminal, and the session ID, in a substantially similar manner as described above. Based on the difference between the time information indicating the start of the session and the time information indicating when the countermeasure data is received for the same session ID stored in the log management table, a communication time for the session can be calculated. Based on this calculation result, the management system 50 is able to manage a communication time for each contents data session sed, with improved accuracy.

Further, in this example, when a predetermined event indicating that contents data cannot be transmitted or received due to a failure in connection between the terminal 10 and the relay terminal 30 is detected, the transmission management apparatus 500 may be caused to select another relay terminal 30 that is capable of relaying contents data between the terminals 10. For the descriptive purposes, it is assumed that a contents data session sed is established between the terminal 10aa and the terminal 10db.

Referring to S65-5 of FIG. 25, the secondary selector 16c of the terminal 10db performs operation of selecting a relay terminal. More specifically, in this example, the secondary selector 16c refers to a time for relaying the preparatory transmit information that is calculated by the calculator 16b, and specifies a relay terminal 30b that has the second shortest time for relaying the preparatory transmit information as a relay terminal to be replaced with the relay terminal having the trouble.

At S66 of FIG. 24B, when the communication unit 11 of the terminal 10db sends the selection information indicating that the selection of the selected relay terminal 30a to the transmission management apparatus 500 through the communication network 2, the communication unit 11 additionally sends information indicating that the relay terminal 30b is a relay terminal to be replaced with the relay terminal 30a. At this time, the transmission management apparatus 500 stores information indicating that the relay terminal 30b is to be replaced with the relay terminal 30a in case an error is detected, in a predetermined memory area.

When the terminal 10aa detects an event indicating that contents data cannot be transmitted due to failure in connection between the terminal 10 and the relay terminal 30, the terminal 10aa transmits the event data for specifying the detected event and the countermeasure data to the transmission management apparatus 500, as described above referring to FIG. 27. When the transmission management apparatus 500 receives the event data indicating the failure in connection between the terminal 10aa and the relay terminal 30, the selector 511 of the transmission management apparatus 500 selects the relay terminal 30b as a relay terminal that relays contents data between the request terminal 10aa and the counterpart terminal 10db.

The session manager 507 accesses the session management table stored in the session management DB 5005 (FIG. 12) to update the relay terminal ID field for the session ID "se1" with the relay terminal ID "111b" of the selected relay terminal 30b. The data transmit/receive 501 of the transmission management apparatus 500 transmits the relay start request information requesting the start of relay operation to the relay terminal 30b through the communication network 2. The relay start request information includes the IP address "1.2.1.3" of the request terminal 10aa and "1.3.2.4" of the counterpart terminal 10db. In this manner, the relay terminal 30b is able to establish the contents data session sed, through which at least one of the low-level resolution image, medium-level resolution image, and high-level resolution image, and the voice data is communicated. As the transmission management apparatus 500 is previously provided with information regarding the relay terminal 30 to be replaced, the transmission management apparatus 500 is able to replace the terminal 30 as soon as the event is detected to allow the terminal 10aa and the terminal 10db to resume videoconference more smoothly with less waiting time.

As described above, in the transmission system of FIG. 1, the terminal 10 transmits or receives contents data to or from another terminal 10 through a contents data session sed. The terminal 10 transmits management data, which is used for managing communication between the terminals 10, to the management system 50 through a management data session sei. After the management data session sei is established, the terminal 10 keeps the management data session sei active at least for a time period between the time when the terminal 10 transmits the session start management data indicating that communication is started and the time when the terminal 10 transmits the session end management data indicating that communication ends. When the terminal 10 detects a predetermined event that may prevent or interrupt communication with a user at another terminal 10, the terminal 10 obtains countermeasure data for the detected event and sends the countermeasure data to the management system 50 through the management data session sei. Since the management data session sei is kept connected, the terminal 10 does not have to newly establish a session with the management system 50 when the event that may prevent or interrupt communication is detected. Through the management data session sei, which has been already established, the terminal 10 is able to transmit countermeasure data to another terminal 10 through the management system 50.

Further, in this example, the terminal 10 manages event data for specifying an event, and countermeasure data that specifies a countermeasure for the event, in association with each other. In this example, the countermeasure is an action that can be taken by the user at the terminal 10 when the event specified by the event data is detected. The countermeasure data generator 20 receives the event data for specifying a detected event from the event detector 18, and obtains countermeasure data that corresponds to the event data. The terminal 10 transmits the countermeasure data to another terminal 10, for example, through the management system 50.

Further, in this example, the countermeasure data stored in the countermeasure management table of the terminal 10 includes more than one countermeasure. The terminal 10 may select at least one countermeasure from the plurality of countermeasures, and send the selected countermeasure to another terminal 10.

Further, in this example, the terminal 10 is provided with a converter 21 that converts voice data to text data. When the event detector 18 detects a predetermined event that may interrupt communication of voice data, the converter 21 converts voice data to be transmitted, to text data. The terminal 10 transmits countermeasure data, which includes the converted text data, to another terminal 10, for example, through the management system 50. The counterpart terminal 10 is able to receive the text data converted from the voice data.

Further, the converter 21 may convert text data to voice data. When the terminal 10 receives text data from another terminal 10, the converter 21 may convert the received text data to voice data for output through the terminal 10.

Further, in this example, the management system 50 manages a time period between the time when the management system 50 receives the session start management data and the time when any event data or countermeasure data is received. In this manner, the management system 50 is able to manage the overall communication time for the contents data session sed with improved accuracy.

Further, as described above, the transmission system 1 is provided with a plurality of relay terminals 30 for relaying contents data from one terminal to another terminal through a contents data session sed. When the transmission management apparatus 500 receives event data that specifies an error in communication from the terminal 10, the transmission management apparatus 500 selects one of the plurality of relay terminals 30 as a relay terminal to be replaced with the relay terminal that is currently in use for communication. In this manner, the terminal 10 is able to re-start communication with another terminal 10.

Further, as described above, the transmission system 1 selects a small number of relay terminals 30 out of a large number of relay terminals 30 based on information regarding network environments. Preferably, the small number of relay terminals 30 is equal to or more than two. While it may be difficult to obtain information regarding the entire network such as the Internet, the transmission system 1 is able to identify the relay terminal that is suitable for communication using information available from the communication network such as information regarding the LAN at which the relay terminal is located. Before sending contents data from the request terminal 10 to the counterpart terminal 10, the management system 50 causes the request terminal 10 to send preparatory transmit information to the counterpart terminal 10 via each one of the selected relay terminals 30 to obtain information regarding a time required for transmitting the preparatory transmit information for each one of the selected relay terminals 30. Based on this obtained information, the relay terminal 30 that is most suitable for communication between the request terminal and the counterpart terminal is selected.

In one example, the management system 50 selects a small number of relay terminals 30 each having the IP address that is similar to at least one of the IP address of the request terminal and the IP address of the counterpart terminal. Once the relay terminals 30 are selected, the management system 50 causes the request terminal 10 to send preparatory transmit information to the counterpart terminal 10 via each one of the selected relay terminals 30 to obtain a time required for transmitting the preparatory transmit information for each one of the selected relay terminals 30. The relay terminal 30 with a smallest value of the time for transmitting the preparatory transmit information is selected. Since the relay terminal 30 is selected based on information obtained using the actual communication network, the request terminal and the counterpart terminal are able to exchange high-quality image data and voice data with relatively high transmission speeds.

Additionally or alternatively, in order to select a small number of relay terminals 30, the maximum data transmission speed of the relay terminal 30 may be taken into account. Once the relay terminals 30 are selected, the management system 50 causes the request terminal 10A to send preparatory transmit information to the counterpart terminal 10B via each one of the selected relay terminals 30 to obtain a time required for transmitting the preparatory transmit information for each one of the selected relay terminals 30. The relay terminal 30 with a smallest value of the time for transmitting the preparatory transmit information is selected. Since the relay terminal 30 is selected based on information obtained using the actual communication network, the request terminal 10A and the counterpart terminal 10B are able to exchange high-quality image data and voice data with relatively high transmission speeds.

Additionally or alternatively, in order to select a small number of relay terminals 30, whether the relay terminal 30 is in the on-line state or not may be taken into account. Since the relay terminal 30 is selected based on the current operation state of the relay terminal 30, the relay terminal 30 is selected with improved accuracy.

The relay terminal 30, the transmission management apparatus 500, the log management apparatus 550, and the program providing system 90, and the maintenance system 100 may be each implemented by a single computer. Alternatively, any number of parts, functions, or modules of the relay terminal 30, the transmission management apparatus 500, the log management apparatus 550, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

The recording medium storing any one of the terminal control program, relay control program, transmission management program such as the transmission management apparatus program and the log management program, or a storage device such as the HDD 204 that stores any one of the terminal control program, relay control program, and transmission management program such as the transmission management apparatus program and the log management program, or the program providing system 90 provided with the HD 204 storing any one of the terminal control program, relay control program, and the transmission management program such as the transmission management apparatus program and the log management program, may be distributed within the country or to another country as a computer program product, for example, for use by a user.

Further, in the above-described examples, the log management apparatus 550 calculates the difference between the time information indicating that start of the session and the time information indicating the end of the session to manage a communication time. Alternatively, the management apparatus 500 may perform this calculation to manage a communication time. Alternatively, the management apparatus 500 may receive time information indicating that start of the session and time information indicating the end of the session to the management apparatus 500, respectively, from the terminal 10 to calculate the difference.

In the above-described examples, the quality of image data to be processed by the relay terminal 30, which is determined based on information obtainable from any one of the data quality management table of FIG. 10 and the quality management table of FIG. 18 is analyzed in terms of image resolution. Alternatively, any other criteria may be used to analyze quality of image data including, for example, depth of image, sampling frequency in case of voice data, and bit length in case of voice data.

Further, the date and time information stored in the relay terminal management table of FIG. 8 or the terminal management table of FIG. 10, the delay time information stored in the session management table of FIG. 12, or the time information stored in the log management table of FIG. 16, is expressed in terms of date and time. Alternatively, the date and time information or the delay time information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 8 and the terminal management table of FIG. 10. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS) server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the transmission system 1 of FIG. 1 may be implemented as a communication system having a portable phone. In such case, the terminal 10 is implemented as the portable phone.

Further, in the above-described examples, the log management table is generated for each terminal ID for identifying the terminal 10. Alternatively, the log management table may be constructed to manage log data regarding a plurality of terminals. In such case, the log management table stores a terminal ID for identifying the terminal 10, a log ID for identifying log data, log data such as management data or event data, a session ID, and time information, in association with each other.

In the above-described examples, the countermeasure data specifies one or more actions that can be taken in response to the detected event. Alternatively, the countermeasure data may additionally specify the event detected by the event detector 18.

In the above-described examples, the contents data is assumed to include image data and voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a transmission terminal including: a first communication unit to transmit or receive contents data to or from a counterpart transmission terminal through a first session; a second communication unit to transmit management data to a transmission management system through a second session, the transmission management system being configured to manage a state indicating connection between the transmission terminal and the counterpart transmission terminal; an event detector to detect a predetermined event that may prevent or interrupt communication between a user at the transmission terminal and a user at the counterpart transmission terminal; and a countermeasure data generator to obtain countermeasure data for the event data, the countermeasure data specifying an action to be taken in response to the predetermined event. The second communication unit keeps the second session active at least for a time period between the time when start management data indicating start of the first session is transmitted by the transmission terminal and the time when end management data indicating end of the first session is transmitted by the transmission terminal, and sends the countermeasure data obtained by the countermeasure data generator to the transmission management system through the second session.

In another example, the transmission terminal further includes: a countermeasure data manager to manage event data for specifying the predetermined event in association with the countermeasure data specifying the action to be taken in response to the predetermined event. The countermeasure data generator obtains the countermeasure data that is stored in association with the predetermined event detected by the event detector.

In another example, the action specified by the countermeasure data includes a plurality of different actions.

In another example, the transmission terminal further includes a converter to convert voice data to text data. When the event detector detects the predetermined event that may prevent or interrupt communication of voice data, the countermeasure data generator causes the converter to convert the voice data to the text data, and to include the text data in the countermeasure data.

The converter may further convert text data to voice data.

In another example, the present invention may reside in a transmission system including the transmission terminal of any one of the above-described examples, a transmission management system to manage a state of communication between the transmission terminal and the counterpart transmission terminal; and a relay terminal to relay the contents data to be transmitted from the transmission terminal to the counterpart transmission terminal through the first session.

In another example, the transmission management system manages the time period between the time when the start management data indicating start of the first session is received and a time when the countermeasure data is received.

In another example, the transmission management system includes a relay terminal selection unit to select, when the transmission management system receives the event data or the countermeasure data from the transmission terminal, a relay terminal to be replaced with the relay terminal that is currently used for communication of contents data.

In another example, the present invention may reside in a transmission management method including: transmitting or receiving contents data to or from a counterpart transmission terminal through a first session; transmitting management data to a transmission management system through a second session, the transmission management system being configured to manage a state indicating connection between the transmission terminal and the counterpart transmission terminal; detecting a predetermined event that may prevent or interrupt communication between a user at the transmission terminal and a user at the counterpart transmission terminal; obtaining countermeasure data for the event data, the countermeasure data specifying an action to be taken in response to the predetermined event; managing the second session to keep the second session active at least for a time period between the time when start management data indicating start of the first session is transmitted by the transmission terminal and the time when end management data indicating end of the first session is transmitted by the transmission terminal; and transmitting the countermeasure data to the transmission management system through the second session.

In another example, the present invention may reside in a computer program configured to cause the transmission terminal to perform any one of the above-described methods.

In another example, the present invention may reside in a recording medium storing a computer program to cause the transmission terminal to perform any one of the above-described methods.

Further, in the above-described examples, the terminal 10 notifies the user of detection of the predetermined event and/or one or more options to be taken through the display 120. Alternatively, the terminal 10 may notify the user of the detected predetermined event or the options to be taken using any other means such as the speaker.

What is claimed is:

1. A transmission terminal, comprising:
   circuitry configured to:
      communicate contents data, which includes at least voice data, with a counterpart transmission terminal through a first session,
      transmit management data to a transmission management system through a second session, and to keep the second session active at least for a time period between the time when the first session starts and the time when the first session ends,
      detect a predetermined event that may prevent or interrupt communication between a user at the transmission terminal and a user at the counterpart transmission terminal through the first session, and
      obtain countermeasure data for the predetermined event and to cause the circuitry to transmit the countermeasure data to the counterpart transmission terminal via the transmission management system through the second session, the countermeasure data specifying an action to be taken by the user at the counterpart transmission terminal in response to the predetermined event; and
   a storage device configured to store a plurality of event data in association with a plurality of countermeasure data specifying an action to be taken in response to a respective event, the countermeasure data for the predetermined event being obtained from the stored plurality of countermeasure data, and the stored plurality of countermeasure data including at least one action to be taken by the user that is based on a loss of voice data communication through the first session.

2. The transmission terminal of claim 1, further comprising:
   a user interface configured to notify the user at the transmission terminal of the detected predetermined event.

3. The transmission terminal of claim 2, wherein
   the circuitry receives event data when the predetermined event is detected, and obtains countermeasure data that is stored in the storage device with respect to the received event data as the countermeasure data to be transmitted.

4. The transmission terminal of claim 3, wherein:
   when the action specified by the countermeasure data includes a plurality of different actions each of which can be taken by the user at the transmission terminal or the user at the counterpart transmission terminal, the user interface requests the user at the transmission terminal to select at least one of the plurality of different actions specified by the countermeasure data, and the circuitry obtains countermeasure data specifying the selected one of the plurality of different actions, as the countermeasure data to be transmitted to the transmission management system through the second session.

5. The transmission terminal of claim 1, the circuitry being further configured to convert between voice data and text data, wherein when the circuitry determines that the detected predetermined event may prevent or interrupt communication of voice data between the transmission terminal and the counterpart transmission terminal, the circuitry performs at least one of:

converting the voice data generated based on a voice of the user at the transmission terminal to text data, and generating the countermeasure data based on the converted text data; and converting text data generated based on a user input received at the transmission terminal to voice, and generating the countermeasure data based on the converted voice data.

6. The transmission terminal of claim 1, wherein the detected predetermined event that may prevent or interrupt communication between the user at the transmission terminal and the user at the counterpart transmission terminal includes:

an event that may prevent or interrupt communication of the contents data between the transmission terminal and the counterpart transmission terminal.

7. The transmission terminal of claim 1, wherein the contents data is videoconferencing data that further includes video data.

8. The transmission terminal of claim 1, wherein the plurality of event data includes at least a microphone error, a speaker error, and a connection error at the transmission terminal.

9. The transmission terminal of claim 8, wherein the stored countermeasure data corresponding to the microphone error, the speaker error, and the connection error, each includes transmitting a request to receive a phone call from the counterpart transmission terminal.

10. The transmission terminal of claim 1, wherein the plurality of event data in association with a plurality of countermeasure data specifies an action to be taken by the user at the transmission terminal in response to a respective event.

11. The transmission terminal of claim 1, wherein the circuitry is configured to communicate the contents data with the counterpart transmission terminal through the first session without transmitting the contents data to the transmission management system.

12. A transmission system, comprising:

a first transmission terminal; and a second transmission terminal configured to communicate contents data with the first transmission terminal, wherein the first transmission terminal includes:

means for communicating contents data, which includes at least voice data with the second transmission terminal through a first session;

means for transmitting management data to a transmission management system through a second session, while keeping the second session active at least for a time period between the time when the first session starts and the time when the first session ends;

means for detecting a predetermined event that may prevent or interrupt communication between a user at the first transmission terminal and a user at the second transmission terminal through the first session;

means for obtaining countermeasure data for the predetermined event from a plurality of stored countermeasure data, the stored countermeasure data including at least one action to be taken by the user that is based on a loss of voice data communication;

means for transmitting the countermeasure data to the counterpart transmission terminal via the transmission management system through the second session, the countermeasure data specifying an action to be taken by the user at the second transmission terminal in response to the predetermined event; and means for storing a plurality of event data in association with a plurality of countermeasure data specifying an action to be taken in response to a respective event, the countermeasure data for the predetermined event being obtained from the stored plurality of countermeasure data, and the stored plurality of countermeasure data including at least one action to be taken by the user that is based on a loss of voice data communication through the first session, and the second transmission terminal includes:

means for receiving the countermeasure data obtained by the first transmission terminal from the transmission management system through the second session, and means for outputting information generated based on the countermeasure data to the user at the second transmission terminal.

13. The transmission system of claim 12, further comprising:

the transmission management system to manage a state of communication between the first transmission terminal and the second transmission terminal based on the management data, wherein the transmission management system includes:

a storage device configured to store time information indicating the time when the first session is established between the first transmission terminal and the second transmission terminal, and to store time information indicating the time when the countermeasure data is received from the first transmission terminal.

14. The transmission system of claim 13, further comprising:

a first relay terminal to relay the contents data to be transmitted between the first transmission terminal and the second transmission terminal through the first session, and wherein the transmission management system further includes:

circuitry configured to:

obtain information regarding a second relay terminal that is previously selected as a candidate relay terminal that is suitable for relaying contents data between the first transmission terminal and the second transmission terminal; and obtain the information regarding the second relay terminal when the countermeasure data is received from the first transmission terminal, and to cause the second relay terminal to relay contents data between the first transmission terminal and the second transmission terminal in place of the first relay terminal.

15. A transmission management method, implemented by a transmission terminal, comprising:

communicating contents data, which includes at least voice data, with a counterpart transmission terminal through a first session;

transmitting management data to a transmission management system through a second session, while keeping the second session active at least for a time period between the time when the first session starts and the time when the first session ends;

detecting a predetermined event that may prevent or interrupt communication between a user at the transmission terminal and a user at the counterpart transmission terminal through the first session;

obtaining countermeasure data for the predetermined event;

transmitting the countermeasure data to the counterpart transmission terminal via the transmission management system through the second session, the countermeasure data specifying an action to be taken by the user at the counterpart transmission terminal in response to the predetermined event; and storing a plurality of event data in association with a plurality of countermeasure data specifying an action to be taken in response to a respective event, the countermeasure data for the predetermined event being obtained from the stored plurality of countermeasure data, and the stored plurality of countermeasure data including at least one action to be taken by the user that is based on a loss of voice data communication through the first session.

* * * * *